(12) United States Patent
Kazama et al.

(10) Patent No.: US 11,029,892 B2
(45) Date of Patent: Jun. 8, 2021

(54) MEMORY CONTROL APPARATUS AND MEMORY CONTROL METHOD FOR SWAPPING DATA BASED ON DATA CHARACTERISTICS

(71) Applicant: FUJITSU LIMITED, Kawasaki (JP)

(72) Inventors: Satoshi Kazama, Kawasaki (JP); Shinya Kuwamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/395,305

(22) Filed: Apr. 26, 2019

(65) Prior Publication Data
US 2019/0347048 A1 Nov. 14, 2019

(30) Foreign Application Priority Data
May 14, 2018 (JP) .............................. JP2018-093154

(51) Int. Cl.
| | |
|---|---|
| *G06F 12/00* | (2006.01) |
| *G06F 3/06* | (2006.01) |
| *G06F 13/00* | (2006.01) |
| *G06F 13/28* | (2006.01) |

(52) U.S. Cl.
CPC .......... *G06F 3/0673* (2013.01); *G06F 3/0604* (2013.01); *G06F 3/0658* (2013.01)

(58) Field of Classification Search
CPC ..... G06F 3/0673; G06F 3/0658; G06F 3/0604
See application file for complete search history.

(56) References Cited

U.S. PATENT DOCUMENTS

| | | | |
|---|---|---|---|
| 5,481,688 A | 1/1996 | Takagi | |
| 2012/0151119 A1* | 6/2012 | Yoshida | G06F 12/0811 711/102 |
| 2014/0019701 A1* | 1/2014 | Ohira | G06F 3/0616 711/165 |
| 2018/0107499 A1* | 4/2018 | Trantham | G06F 9/445 |

FOREIGN PATENT DOCUMENTS

| | | |
|---|---|---|
| JP | 63-244152 | 10/1988 |
| JP | 5-233452 | 9/1993 |

* cited by examiner

*Primary Examiner* — Mark A Giardino, Jr.
(74) *Attorney, Agent, or Firm* — Fujitsu Patent Center

(57) ABSTRACT

A memory control apparatus includes a first memory, a second memory, a third memory, and a processor configured to add, to management information, first identification information and information indicating a position where first data is stored when the first data is stored in the first memory, add, to the management information, the first identification information and information indicating a position where second data is stored when the second data is stored in the second memory, add, to the management information, second identification information and information indicating a position where third data is stored when the third data is stored in the third memory, determine which one of the first identification information and the second identification information is associated with fourth data, and perform retrieval of the fourth data from the first memory or the second memory in accordance with information indicating a position where the fourth data is stored.

16 Claims, 16 Drawing Sheets

FIG. 5

| PAGE TABLE | | | 160 |
|---|---|---|---|
| ENTRY NUMBER | PAGE FRAME NUMBER (PFN) | VALID FLAG (V) | |
| ... | ... | ... | |
| #00250 | ADDRESS X IN SWAP FILE | 0 | |
| ... | ... | ... | |
| #00160 | 0x010000A00 | 1 | |
| ... | ... | ... | |
| #00052 | 0x000000800 | 1 | |
| ... | ... | ... | |

FIG. 9

| ENTRY NUMBER | PAGE FRAME NUMBER (PFN) | VALID FLAG (V) | DATA CHARACTERISTIC (N) |
|---|---|---|---|
| | | | PAGE TABLE |

| ENTRY NUMBER | PAGE FRAME NUMBER (PFN) | VALID FLAG (V) | DATA CHARACTERISTIC (N) |
|---|---|---|---|
| ... | ... | ... | ... |
| #00250 | ADDRESS X IN SWAP FILE | 0 | SSD PRIORITIZED |
| ... | ... | ... | ... |
| #00160 | 0x010000A00 | 1 | NORMAL |
| ... | ... | ... | ... |
| #00052 | 0x000000800 | 1 | SCM PRIORITIZED |
| ... | ... | ... | ... |

170 — PAGE TABLE

FIG. 14

| ENTRY NUMBER | PAGE FRAME NUMBER (PFN) | VALID FLAG (V) | DATA CHARACTERISTIC ||
|---|---|---|---|---|
| | | | READ FREQUENCY | WRITE FREQUENCY |
| ... | ... | ... | ... | ... |
| #00250 | ADDRESS X IN SWAP FILE | 0 | LOW | LOW |
| ... | ... | ... | ... | ... |
| #00160 | 0x010000A00 | 1 | HIGH | HIGH |
| ... | ... | ... | ... | ... |
| #00052 | 0x000000800 | 1 | HIGH | LOW |
| ... | ... | ... | ... | ... |

PAGE TABLE — 180

FIG. 15

| SWAP-IN CONTROL TABLE | | | | | 190 |
|---|---|---|---|---|
| Read FREQUENCY | WRITE FREQUENCY | INITIAL DISPOSITION | SCM←SSD | DRAM←SSD |
| HIGH | HIGH | DRAM | — | MOVEMENT |
| HIGH | INTERMEDIATE | DRAM | — | MOVEMENT |
| HIGH | LOW | DRAM | — | COPYING |
| INTERMEDIATE | HIGH | DRAM | MOVEMENT | — |
| INTERMEDIATE | INTERMEDIATE | SCM | MOVEMENT | — |
| INTERMEDIATE | LOW | SCM | COPYING | — |
| LOW | HIGH | DRAM | MOVEMENT | — |
| LOW | INTERMEDIATE | SCM | MOVEMENT | — |
| LOW | LOW | SCM | COPYING | — |

MEMORY CONTROL APPARATUS AND MEMORY CONTROL METHOD FOR SWAPPING DATA BASED ON DATA CHARACTERISTICS

CROSS-REFERENCE TO RELATED APPLICATION

This application is based upon and claims the benefit of priority of the prior Japanese Patent Application No. 2018-93154, filed on May 14, 2018, the entire contents of which are incorporated herein by reference.

FIELD

The embodiments discussed herein are related to a memory control technique.

BACKGROUND

In an information processing system, data processed by a calculation device (for example, a central processing unit (CPU)) is stored in a main storage device (for example, a random access memory (RAM)). The main storage device is operated at a relatively high speed, but has a relatively small capacity. Therefore, generally, an auxiliary storage device (for example, a solid state drive (SSD) or a hard disk drive (HDD)) which is operated at a lower speed than the main storage device but has a relatively large capacity is used along with the main storage device such that a storage capacity is extended. An extended storage device which is operated at a lower speed than the main storage device but is operated at a higher speed than the auxiliary storage device may be used along with the main storage device or the auxiliary storage device such that a storage capacity is further extended.

For example, an information processing apparatus has been proposed in which an extended storage device is used as a file temporary storage location, or a swap area or the like in virtual storage management. The proposed information processing apparatus has an address conversion table for converting a virtual address which is accessed by a command processing device into a real address. The address conversion table has, as elements thereof, a real page address corresponding to a virtual page address, and a page table word including an extended storage presence bit (bit E) indicating whether a real page is present in a main storage device or is present in an extended storage device.

In the proposed information processing apparatus, the page table word includes a page presence bit P indicating whether or not a page is present in the storage devices. The information processing apparatus determines whether a page is present in the main storage device or the extended storage device based on a value of the bit E, and also determines whether or not a page is present is an external storage device based on a combination of a value of the bit E and a value of the bit P according to exceptional occurrence of access to the page.

A computer has also been proposed in which it is checked whether or not a real address obtained through address conversion of a predetermined operand of a specific command is a real address in an extended storage device. In the proposed computer, in order to perform the checking, a flag indicating whether or not an allocated real page is present in the extended storage device is provided in each item corresponding to a page of a page table, and a management program sets the flag during a page allocation process.

For example, Japanese Laid-open Patent Publication Nos. 5-233452 and 63-244152 discuss the related art.

SUMMARY

According to an aspect of the embodiments, a memory control apparatus includes a first memory, a second memory, a third memory, and a processor configured to add, to management information, first identification information and information indicating a position where first data is stored when the first data is stored in the first memory, add, to the management information, the first identification information and information indicating a position where second data is stored when the second data is stored in the second memory, add, to the management information, second identification information and information indicating a position where third data is stored when the third data is stored in the third memory, determine which one of the first identification information and the second identification information is associated with fourth data, and perform retrieval of the fourth data from the first memory or the second memory in accordance with information indicating a position where the fourth data is stored The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of swap-out/swap-in;

FIG. 5 is a diagram illustrating an example of a page table;

FIG. 8 is a diagram illustrating a comparative example of swap-out/swap-in;

FIG. 9 is a diagram illustrating an example of a page table of a third embodiment;

FIG. 14 is a diagram illustrating an example of a page table of a fourth embodiment;

FIG. 15 is a diagram illustrating an example of a swap-in control table; and FIG. 16 is a diagram illustrating an example of swap-out/swap-in.

DESCRIPTION OF EMBODIMENTS

As described above, a capacity of a main storage device may be made up for by an extended storage device and an auxiliary storage device. However, in the related art, in a case where a plurality of pieces of management information (for example, the bit E or the bit P) are provided to manage which type of storage device data is stored in, there is a problem in that an amount of held information is increased. In a case where an amount of process target information is increased, the number of process steps is increased, and thus an overhead caused by data access may occur.

Figure 1:
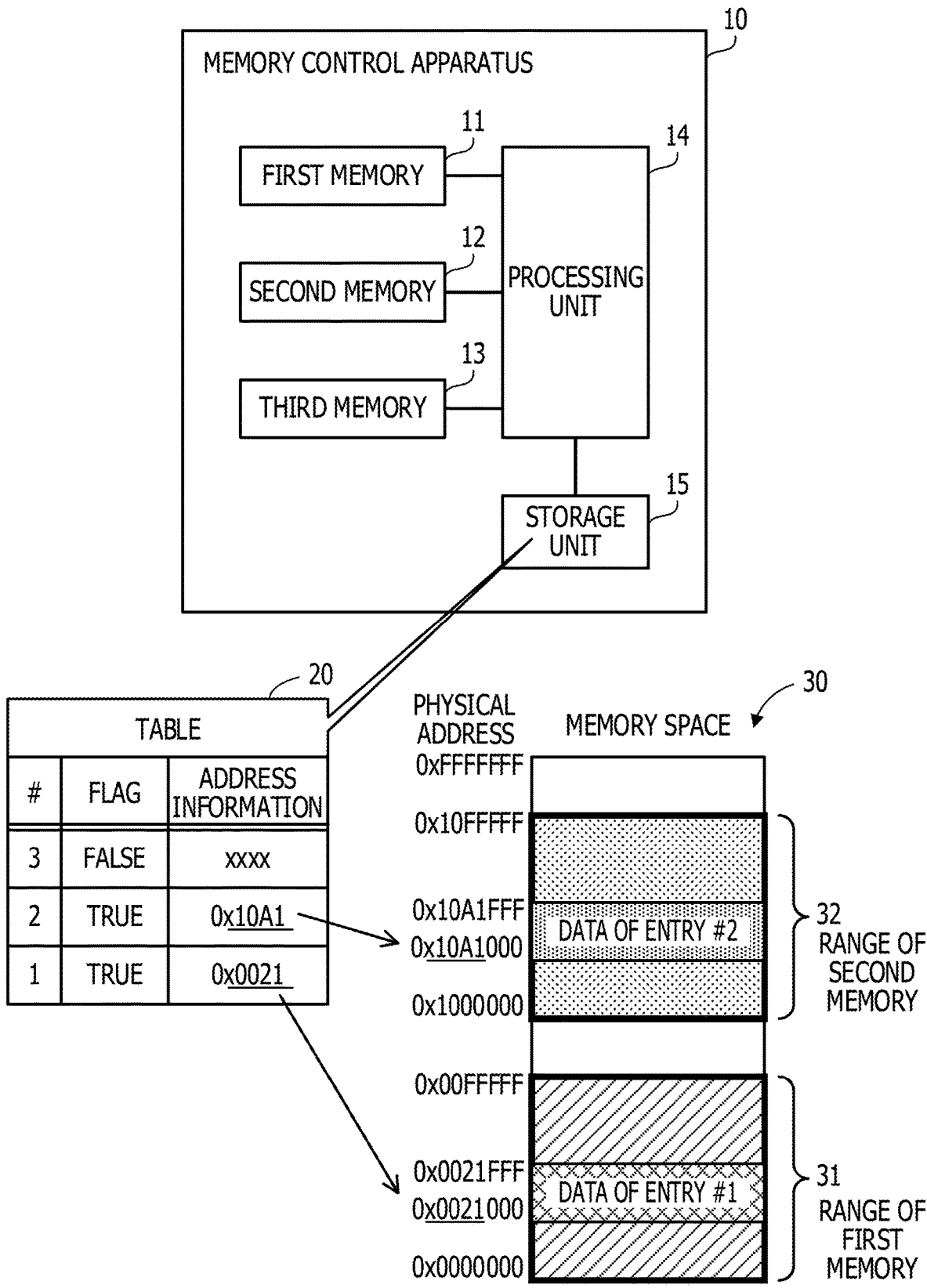
FIG. 1 is a diagram illustrating an example of a memory control apparatus of a first embodiment.

A first embodiment will be described. FIG. 1 is a diagram illustrating an example of a memory control apparatus of the first embodiment.

A memory control apparatus 10 includes a first memory 11, a second memory 12, a third memory 13, a processing unit 14, and a storage unit 15. The memory control apparatus 10 controls data disposition in the first memory 11, the second memory 12, and the third memory 13.

The second memory 12 is operated at a lower speed than the first memory 11. For example, the first memory 11 is operated at a higher speed than the second memory 12. The third memory 13 is operated at a lower speed than the second memory 12. For example, the second memory 12 is operated at a higher speed than the third memory 13. Here, the "lower speed" indicates that an amount of transmitted data per unit time is smaller. The "higher speed" indicates that an amount of transmitted data per unit time is larger.

For example, the first memory 11 is a main storage device (main memory). An example of the main storage device may be a dynamic RAM (DRAM). The second memory 12 is an extended storage device. An example of the extended storage device may be a storage class memory (SCM). For example, a magnetoresistive RAM (MRAM) may be used as the SCM. The third memory 13 is an auxiliary storage device. An example of the auxiliary storage device may be an SSD or an HDD. The second memory 12 and the third memory 13 are used as swap regions for the first memory 11.

The first memory 11, the second memory 12, and the third memory 13 may not be built into the memory control apparatus 10. For example, the first memory 11, the second memory 12, and the third memory 13 may be externally connected to the memory control apparatus 10.

The processing unit 14 performs a process of controlling access to the first memory 11, the second memory 12, and the third memory 13. The processing unit 14 may include a CPU, a digital signal processor (DSP), an application specific integrated circuit (ASIC), a field programmable gate array (FPGA), and the like. The processing unit 14 may be a processor executing a program. The "processor" may include a set of a plurality of processors (multi-processor).

The storage unit 15 stores information used for processes in the processing unit 14. The storage unit 15 may be a predetermined buffer memory which is provided separately from the first memory 11, the second memory 12, and the third memory 13. Alternatively, the storage unit 15 may be, for example, a predetermined partial region of a memory region of the first memory 11.

The storage unit 15 stores a flag in which first identification information or second identification information is set according to a memory storing the data, and information indicating an address in which the data is stored in a data storage destination memory region, in correlation with the data.

For example, the storage unit 15 stores a table 20. The table 20 includes items of an entry number (#), a flag, and address information. A number for identifying data is set in the entry number. Data corresponding to an entry number "X" will be referred to as "data of the entry #X". The flag is information expressed by one bit. The first identification information or the second identification information is set in the flag. The first identification information is, for example, "true" or "1". The second identification information is, for example, "false" or "0". Information indicating an address in which data is stored in a memory region storing the data corresponding to an entry number is set in the address information.

In a case where data is stored in the first memory 11 or the second memory 12 (either one of the first memory 11 and the second memory 12), the processing unit 14 sets the first identification information in the flag. In a case where data is stored in the third memory 13, the processing unit 14 sets the second identification information in the flag.

For example, data is stored in each memory in the unit of a page with a predetermined size. As an example, a size of a single page is assumed to be "0x1000" bytes in hexadecimal notation ("4096" bytes in decimal notation). In this case, for example, address information in which last two digits of a physical address of a corresponding memory region are removed is registered in the table 20. The processing unit 14 may obtain a head physical address of a region in which the page is stored by adding "0x000" to the last two digits of the address information (for example, by multiplying the address information by "0x1000").

Here, as address information for the first memory 11 and the second memory 12, address information corresponding to a physical address of a memory space 30 including a memory region of the first memory 11 and a memory region of the second memory 12 is used. For example, the processing unit 14 allocates a range 31 of the memory space 30 to the first memory 11, and allocates a range 32 of the memory space 30 to the second memory 12.

In the example illustrated in FIG. 1, the range 31 is "0x0000000 to 0x00FFFFF". In the example illustrated in FIG. 1, the range 32 is "0x1000000 to 0x10FFFFF". A head address of the range 32 is an address obtained by adding a predetermined offset ("0x1000000" in the example illustrated in FIG. 1) to a head address of the memory space 30. A physical address indicated by the offset "0x1000000" corresponds to, for example, a head address of the memory region of the second memory 12.

For example, the processing unit 14 stores data (page) of the entry #1 in the first memory 11 with a physical address "0x0021000" of the memory space 30 as a head address. An end address of the data is "0x0021000". Then, the processing unit 14 stores the flag "true" and the address information "0x0021" in the table 20 with respect to the entry #"1". For example, the processing unit 14 sets the flag "true" in the table 20, and records the address information "0x0021" in the table 20, with respect to the data of the entry #"1".

For example, the processing unit 14 stores data (page) of the entry #2 in the second memory 12 with a physical address "0x10A1000" of the memory space 30 as a head address. An end address of the data is "0x10A1FFF". Then, the processing unit 14 stores the flag "true" and the address information "0x10A1" in the table 20 with respect to the entry #"2". For example, the processing unit 14 sets the flag "true" in the table 20, and records the address information "0x10A1" in the table 20, with respect to the data of the entry #"2".

For example, the processing unit 14 stores data (page) of the entry #3 in the third memory 13. Then, the processing unit 14 stores the flag "false" and address information "xxxx" corresponding to a physical address in which the data of the entry #"3" is stored in the third memory 13, in the table 20, with respect to the entry #"3".

Next, a description will be made of a case where the processing unit 14 accesses data stored in the first memory 11, the second memory 12, and the third memory 13.

The processing unit 14 refers to a flag corresponding to data when accessing the data. In a case where the first identification information is set in a flag, the processing unit 14 determines that access target data is stored in the first memory 11 or the second memory 12. In a case where the second identification information is set in a flag, the processing unit 14 determines that access target data is stored in the third memory 13.

As described above, in a case where the first identification information is set in the flag, the processing unit 14 may determine that access target data is stored in the first memory 11 or the second memory 12. In this case, the processing unit 14 further determines a memory which is a data storage destination of the first memory 11 and the second memory 12 based on information indicating an address, stored in the storage unit 15 with respect to the data.

For example, the processing unit 14 determines which of the first memory 11 or the second memory 12 access target data is stored in based on address information stored in the table 20 with respect to the data. For example, as described above, an address range of the range 32 is a range with a predetermined size having, as a head address, an address obtained by adding the predetermined offset "0x1000000" to the head address of the memory space 30. Therefore, the processing unit 14 determines a storage destination memory according to whether or not a physical address which is related to the entry of the flag "true" and is included in the range 31 or the range 32 in the table 20. In a case where a physical address corresponding to address information of the entry of the flag "true" is included in the range 31, the processing unit 14 determines first memory 11 as a storage destination memory of data of the entry. On the other hand, in a case where a physical address corresponding to address information of the entry of the flag "true" is included in the range 32, the processing unit 14 determines the second memory 12 as a storage destination memory of data of the entry.

The processing unit 14 specifies a data storage position in the storage destination memory determined as a data storage destination, based on the address information. For example, a physical address obtained based on the address information corresponds to a physical address of the first memory 11 or a physical address of the second memory 12. As described above, the range 31 (the physical address range "0x0000000 to 0x00FFFFF") corresponds to a memory region of the first memory 11. For example, the range 32 (the physical address range "0x1000000 to 0x10FFFFF") corresponds to a memory region of the second memory 12. The processing unit 14 may specify an access position (for example, an offset position corresponding to "0x0021000" from the head of the first memory 11) in the first memory 11 based on a head physical address (for example, "0x0021000") of an access destination obtained in the range 31. Alternatively, the processing unit 14 may specify an access position (for example, an offset position corresponding to "0x00A1000" from the head of the second memory 12) in the second memory 12 based on a head physical address (for example, "0x10A1000") of an access destination obtained in the range 32.

The processing unit 14 accesses data stored at the specified storage position. For example, the processing unit 14 reads or writes the data. Here, in a case where data stored in the second memory 12 is accessed, the processing unit 14 omits swap-in of the data (restricts the swap-in) to the first memory 11, and directly accesses the data stored in the second memory 12. For example, with respect to data in which the first identification information is set in a flag, the processing unit 14 permits hierarchy movement (for example, swap-out) from the first memory 11 to the second memory 12, and restricts hierarchy movement (for example, swap-in) from the second memory 12 to the first memory 11. Consequently, there is an advantage of reducing an overhead caused by swap-in of the data.

In a case where the second identification information is set in a flag corresponding to access target data, the processing unit 14 determines the third memory 13 as a memory which is a data storage destination based on the flag. In this case, the processing unit 14 acquires address information recorded for the data from the table 20, and specifies a storage position of the access target data in the third memory 13 based on the address information. The processing unit 14 accesses the data stored at the specified storage position in the third memory 13. For example, the processing unit 14 reads the data from the third memory 13, writes the data into the first memory 11 (swap-in), and accesses the data written in the first memory 11.

For example, the processing unit 14 receives access to the data of the entry #1. The processing unit 14 checks that the flag corresponding to the entry #"1" is "true" by referring to the table 20. Since the flag is "true", the processing unit 14 determines a memory which is a storage destination of the data based on the address information "0x0021" corresponding to the entry #"1". In this case, the physical address "0x0021000" corresponding to the address information "0x0021" is included in the range 31 of the memory space 30. Therefore, the processing unit 14 determines that access target data is stored in the first memory 11. The processing unit 14 accesses data stored in an address range having a predetermined size (page size) by using the physical address "0x0021000" corresponding to the address information "0x0021" as a head address in the first memory 11.

The processing unit 14 receives access to the data of the entry #2. The processing unit 14 checks that the flag corresponding to the entry #"2" is "true" by referring to the table 20. Since the flag is "true", the processing unit 14 determines a memory which is a storage destination of the data based on the address information "0x10A1" corresponding to the entry #"2". In this case, the physical address "0x10A1000" corresponding to the address information "0x10A1" is included in the range 32 of the memory space 30. Therefore, the processing unit 14 determines that access target data is stored in the second memory 12. The processing unit 14 accesses data stored in an address range having a predetermined size (page size) by using the physical address "0x10A1000" as a head address in the second memory 12. In this case, as described above, the processing unit 14 omits swap-in of the data to the first memory 11, and directly accesses the data stored in the second memory 12.

The processing unit 14 receives access to the data of the entry #3. The processing unit 14 checks that the flag corresponding to the entry #"3" is "false" by referring to the table 20. Since the flag is "false", the processing unit 14 determines the third memory 13 as a memory which is a storage destination of the data based on the address information "xxxx" corresponding to the entry #"3". The processing unit 14 specifies a storage position of access target data in the third memory 13 based on the address information "xxxx", and accesses the data stored at the specified storage position. In this case, the processing unit 14 swaps the data from the third memory 13 into the first memory 11. The processing unit 14 accesses the data swapped in the first memory 11. The processing unit 14 sets the flag corresponding to the entry #"3" of the table 20 to "true" according to the swap-in, and updates the address information to address information (information indicating a physical address in the memory space 30) indicating the swap-in destination.

According to the memory control apparatus 10, a flag in which the first identification information or the second identification information is set according to a memory storing data, and information indicating an address in which the data is stored in a memory region which is a data storage destination, are stored in the storage unit 15 in correlation with the data. In a case where data is stored in the first memory 11 or the second memory 12, the processing unit 14 sets the first identification information in a flag. In a case where data is stored in the third memory 13, the second identification information is set in a flag. In a case where the first identification information is set in a flag corresponding to data when the data is accessed, one of the first memory 11 and the second memory 12 is determined as a memory which is a data storage destination based on information indicating an address. A data storage position in the determined storage destination memory is specified.

Consequently, a data position may be efficiently specified by using a simple data structure. For example, in a case where a plurality of pieces of management information (for example, a plurality of bits (or a plurality of flags)) are provided to manage which type of storage device data is stored in, there is a problem in that an amount of held information is increased. This problem becomes more remarkable as a capacity of each memory is increased such that the number of pages is increased. In a case where an amount of process target information is increased, the number of process steps is increased, and thus an overhead caused by data access may occur.

Therefore, the memory control apparatus 10 represents that data is stored in the first memory 11 or the second memory 12 by using the first identification information set in a single flag, and represents that data is stored in the third memory 13 by using the second identification information. In a case where the flag indicates the first identification information when data is accessed, it is determined whether a memory which is a storage destination of the data is the first memory 11 or the second memory 12 based on address information recorded in the table 20, and a storage position of the data is specified. Thus, a plurality of bits (or a plurality of flags) for specifying a memory which is a data storage destination are not provided, and thus an increase of an amount of information held in the memory control apparatus 10 is suppressed. Since an amount of process target information is suppressed, an increase of the number of process steps may be suppressed, and thus an overhead caused by data access may be reduced. As a result, data access may be performed at a high speed.

As described above, in a case where the second memory 12 is accessed, the processing unit 14 does not perform swap into the first memory 11, and directly accesses the second memory 12. In recent years, a memory which is operated at a considerably higher speed than the third memory 13 has been available as the second memory 12, and swap-in is omitted such that an overhead caused by the swap-in is reduced, and thus data access may be realized at a higher speed.

Figure 2:
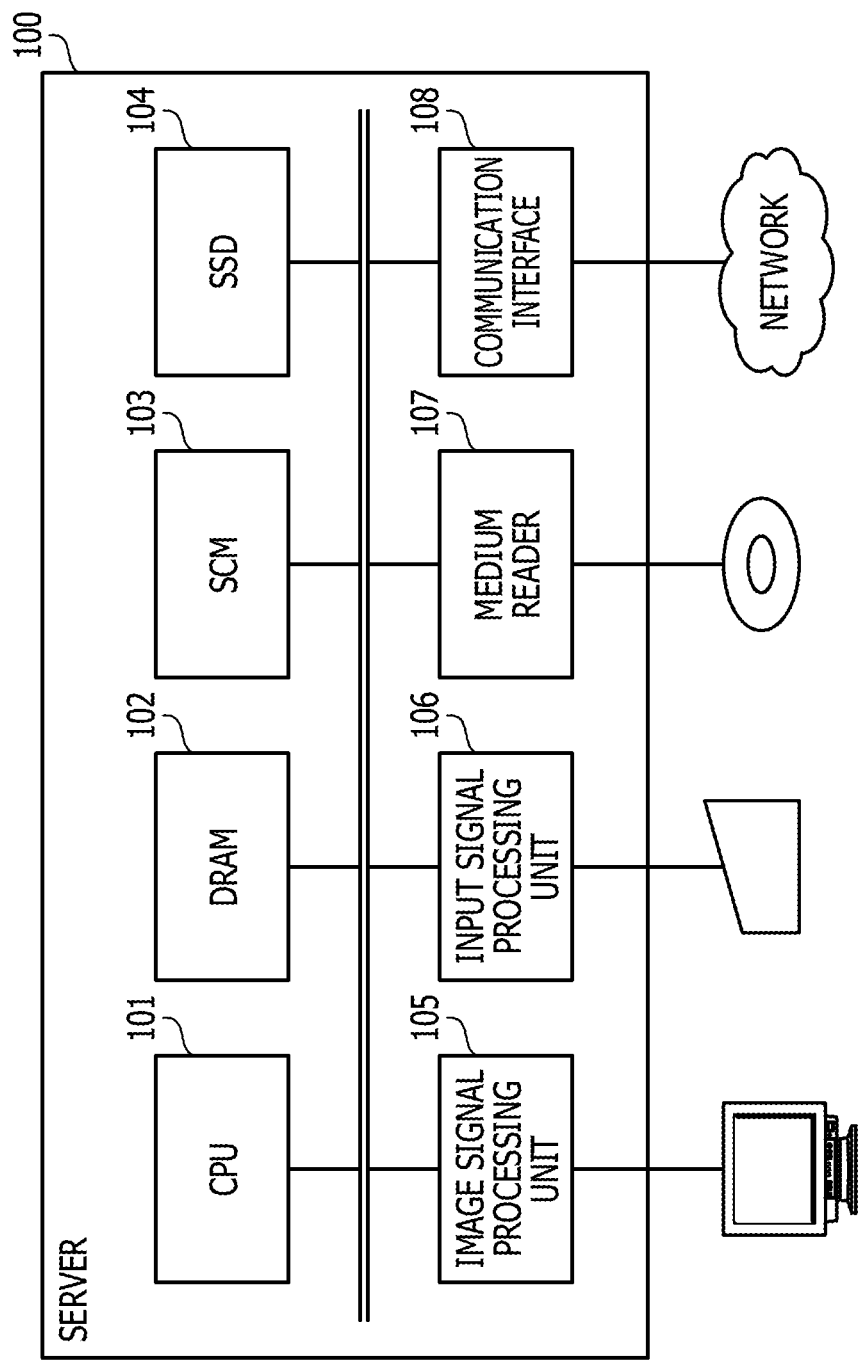
FIG. 2 is a block diagram illustrating a hardware example of a server of a second embodiment.

Next, a second embodiment will be described. FIG. 2 is a block diagram illustrating a hardware example of a server of the second embodiment.

A server 100 includes a CPU 101, a DRAM 102, an SCM 103, an SSD 104, an image signal processing unit 105, an input signal processing unit 106, a medium reader 107, and a communication interface 108. The server 100 is an example of the memory control apparatus 10 of the first embodiment. The CPU 101 is an example of the processing unit 14 of the first embodiment.

The CPU 101 is a processor executing program commands. The CPU 101 loads a program or at least some data stored in the SSD 104 to the DRAM 102, and executes the program. The CPU 101 may include a plurality of processor cores. The server 100 may include a plurality of processors. Processes described below may be in parallel by using a plurality of processors or processor cores. A set of the plurality of processors will be referred to as a "multi-processor" or will be simply referred to as a "processor".

The DRAM 102 is a main storage device of the server 100, and is a volatile semiconductor memory temporarily storing a program executed by the CPU 101 or data used for calculation by the CPU 101. The DRAM 102 is an example of the first memory 11 of the first embodiment. The DRAM 102 may be referred to as a first type of memory.

The SCM 103 is an extended storage device of the server 100. The SCM 103 provides a swap region for the DRAM 102. The SCM 103 is, for example, an MRAM. The SCM 103 is an example of the second memory 12 of the first embodiment. The SCM 103 may be referred to as a second type of memory.

The SSD 104 is an auxiliary storage device of the server 100, and is a nonvolatile storage device storing software programs such as an operating system (OS), middleware, and application software, and data. The SSD 104 provides a swap region for the DRAM 102. The SSD 104 may also be used as a swap region for the SCM 103. The SSD 104 is an example of the third memory 13 of the first embodiment. The SSD 104 may be referred to as a third type of memory.

Here, among the DRAM 102, the SCM 103, and the SSD 104, the DRAM 102 has the highest access speed, the SCM 103 has the second highest access speed, and the SSD 104 has the lowest access speed. On the other hand, among the DRAM 102, the SCM 103, and the SSD 104, the SSD 104 has the largest storage capacity, the SCM 103 has the second largest storage capacity, and the DRAM 102 has the smallest storage capacity.

The image signal processing unit 105 outputs an image to a display 201 connected to the server 100 in response to a command from the CPU 101. As the display 201, any type of display such as a cathode ray tube (CRT) display, a liquid crystal display (LCD), an organic electro-luminescence (EL) display may be used.

The input signal processing unit 106 acquires an input signal from an input device 202 connected to the server 100, and outputs the input signal to the CPU 101. As the input device 202, a pointing device such as a mouse, a touch panel, a touch pad, or a track ball, a keyboard, a remote controller, a button switch, or the like may be used. A plurality of types of input devices may be connected to the server 100.

The medium reader 107 is a reading device which reads a program or data recorded on a recording medium 203. As the recording medium 203, for example, a magnetic disk, an optical disc, a magneto-optical disk (MO), or a semiconductor memory may be used. The magnetic disk includes a flexible disk (FD) or an HDD. The optical disc includes a compact disc (CD) or a digital versatile disc (DVD).

The medium reader 107 copies, for example, a program or data read from the recording medium 203 to other recording media such as the DRAM 102, the SCM 103, and the SSD 104. The read program is executed by, for example, the CPU 101. The recording medium 203 may be a portable recording medium, and may be used to distribute a program or data. The recording medium 203 or the SSD 104 may be referred to as a computer readable recording medium.

The communication interface 108 is an interface which is connected to a network 204, and performs communication with other computers via the network 204. The communication interface 108 is connected to a communication device such as a switch or a router via a cable.

Figure 3:
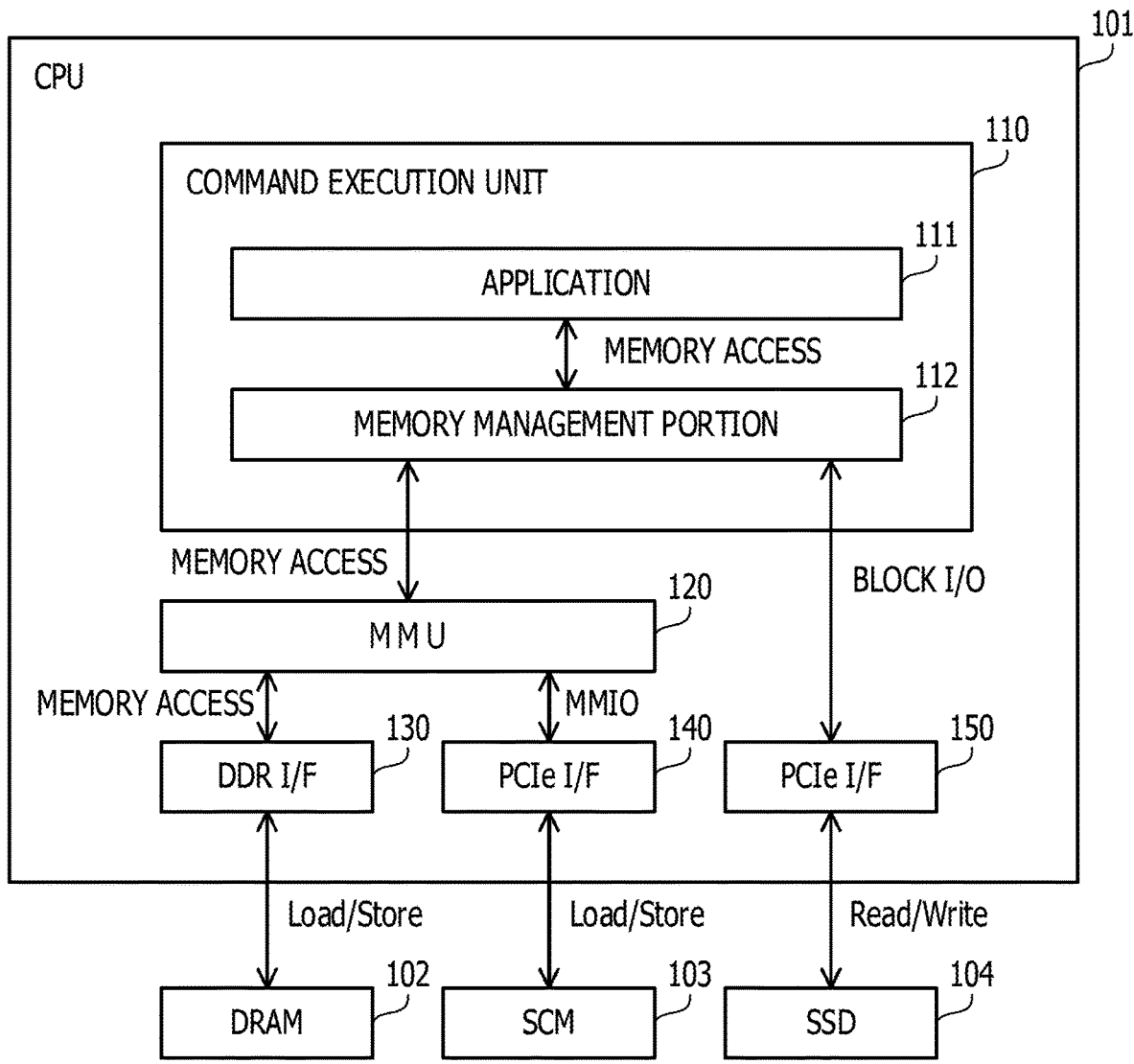
FIG. 3 is a block diagram illustrating a function example of a CPU.

FIG. 3 is a block diagram illustrating a function example of the CPU. The CPU 101 includes a command execution unit 110, a memory management unit (MMU) 120, a double-data-rate interface (DDR I/F) 130, and Peripheral Component Interconnect express interfaces (PCIe I/F) 140 and 150.

The command execution unit 110 is a processor core of the CPU 101. The command execution unit 110 realizes a function of an application 111 by executing an application program including a plurality of commands. The application 111 accesses data stored in the DRAM 102, the SCM 103, and the SSD 104, and performs a predetermined process corresponding to a function provided by the application 111 based on the data. The command execution unit 110 realizes a function of a memory management portion 112 by executing a memory control program including a plurality of commands.

The memory management portion 112 manages data in the page unit. As an example, a size of a single page is assumed to be 0x1000 bytes (4096 bytes). The memory management portion 112 manages a storage device which is a page storage destination. The memory management portion 112 controls swap-out from the DRAM 102 to the SCM 103, swap-out from the SCM 103 to the SSD 104, and swap-in from the SSD 104 to the DRAM 102.

The memory management portion 112 receives a request for memory access performed by the application 111. The memory management portion 112 performs memory access to the DRAM 102 or the SCM 103 via the MMU 120, or block input/output (I/O) for the SSD 104 via the PCIe I/F 150 without using the MMU 120, in response to the request.

The memory management portion 112 controls the MMU 120 to directly access the SCM 103 without swapping a page into the DRAM 102 from the SCM 103 when the page stored in the SCM 103 is accessed.

The MMU 120 processes memory access for which an instruction is given from the memory management portion 112. In response to the instruction from the memory management portion 112, the MMU 120 performs memory access to the DRAM 102 via the DDR I/F 130, or performs memory-mapped input/output (MMIO) for the SCM 103 via the PCIe I/F 140. By using the MMIO technique, a physical address may be allocated to a unit region included in a memory region including a memory region of the DRAM 102 and a memory region of the SCM 103, and the DRAM 102 and the SCM 103 may be accessed based on the physical address.

The DDR I/F 130 accesses the DRAM 102 by using a load/store command. The load command causes data (page) to be read from a designated physical address of the DRAM 102 and to be stored in a predetermined cache (not illustrated) of the CPU 101. The store command causes the data stored in the cache to be written into a designated physical address of the DRAM 102.

The PCIe I/F 140 accesses the SCM 103 by using a load/store command. The load command causes data (page) to be read from a designated physical address of the SCM 103 and to be stored in a predetermined cache of the CPU 101. The store command causes the data stored in the cache to be written into a designated physical address of the SCM 103.

The PCIe I/F 150 accesses the SSD 104 by using a read/write command. The read command causes data (page) to be read from a designated physical address of the SSD 104. The memory management portion 112 stores the read data in the DRAM 102. The write command causes the data stored in the SCM 103 to be written into a designated physical address of the SSD 104.

Here, the CPU 101 may be an example of the memory control apparatus 10 of the first embodiment (in this case, the command execution unit 110 may be an example of the processing unit 14 of the first embodiment).

Figure 4:
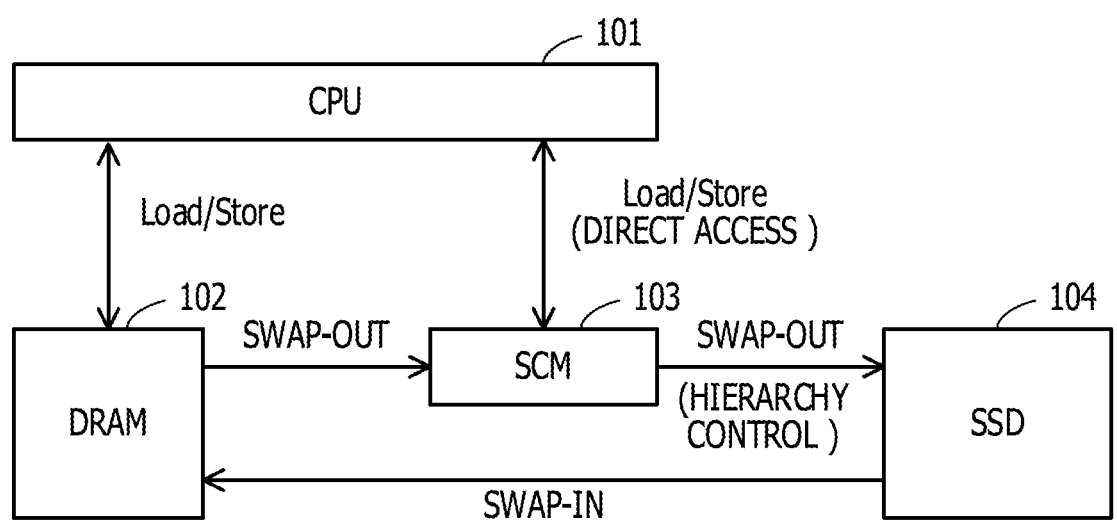

FIG. 4 is a diagram illustrating an example of swap-out/swap-in. The CPU 101 accesses the DRAM 102 by using a load/store command. Access to the DRAM 102 from the CPU 101 is direct access. The CPU 101 accesses the SCM 103 by using a load/store command. Access to the SCM 103 from the CPU 101 is direct access. In a case where there is no vacant region in the DRAM 102 when a storage region (frame) of the DRAM 102 is allocated to a new page, a page stored in the DRAM 102 is swapped out to the SCM 103. In a case where there is no vacant region in the SCM 103 when a new page is allocated to the SCM 103, a page stored in the SCM 103 is swapped out to the SSD 104. Least Recently Used (LRU) is used for an algorithm for swap-out from the DRAM 102 to the SCM 103 and swap-out from the SCM 103 to the SSD 104. According to the LRU, among pages stored in a memory, a page to which the longest time has elapsed from the last access is selected as a swap-out target. When the CPU 101 accesses a page stored in the SSD 104, the page stored in the SSD 104 is swapped into the DRAM 102. The CPU 101 accesses the page stored in the DRAM 102 by using a load/store command.

The memory management portion 112 manages a page storage destination by using a page table. Next, the page table will be described.

FIG. 5 is a diagram illustrating an example of a page table. A page table 160 is stored in, for example, a buffer of the MMU 120. The page table 160 may be stored in a predetermined region of the DRAM 102. The page table 160 corresponds to the table 20 of the first embodiment. The page table 160 includes items of an entry number, a page frame number (PFN), and a valid flag (V).

The entry number is a number for identifying an entry (a single record in the page table 160) of the page table 160. The page frame number is information (address information) indicating a head physical address of a storage region (frame) storing a page. In the following description, the page frame number will be abbreviated to a "PFN" in some cases. The valid flag is information indicating whether or not a page is stored in the DRAM 102 or the SCM 103. A valid flag "1" indicates that a page is stored in the DRAM 102 or the SCM 103. A valid flag "0" indicates that a page is not stored in the DRAM 102 or the SCM 103. The valid flag "0" is set for a page stored in the SSD 104.

For example, in a case where the valid flag is "1", a page frame number indicating a physical address in the DRAM 102 or a page frame number indicating a physical address in the SCM 103 is set in an entry of the page table. For a page swapped out to the SSD 104, "0" is set as a valid flag, and an "address in swap file" is set as a page frame number.

Each entry (for example, an entry number) of the page table 160 is correlated with a virtual address recognized by the application 111. The application 111 designates a virtual address of an access destination for the memory management portion 112. Then, the memory management portion 112 retrieves an entry corresponding to the designated virtual address from the page table 160. The memory management portion 112 specifies a storage device which is an access destination and a physical address in the storage device based on a valid flag and a page frame number included in the entry.

For example, an entry including an entry number "#00052", a page frame number "0x000000800", and a valid flag "1" is registered in the page table 160. This entry indicates that a valid flag for a page corresponding to "#00052" is "1", and a page frame number is "0x000000800".

An entry including an entry number "#00160", a page frame number "0x010000A00", and a valid flag "1" is registered in the page table 160. This entry indicates that a valid flag for a page corresponding to "#00160" is "1", and a page frame number is "0x010000A00".

An entry including an entry number "#00250", a page frame number "address X in swap file", and a valid flag "0" is registered in the page table 160. This entry indicates that a valid flag for a page corresponding to "#00250" is "0", and a page frame number is "address X in swap file".

Other information may be stored in the page table 160 without limitation to the above-described information. For example, information indicating a restriction of write/read for a corresponding page or information indicating an access authority may be stored.

In a case where the page table 160 is stored in a buffer of the MMU 120, the buffer may be an example of the storage unit 15 of the first embodiment. In a case where the page table 160 is stored in a predetermined memory region of the DRAM 102, the predetermined memory region may be an example of the storage unit 15 of the first embodiment.

Figure 6:
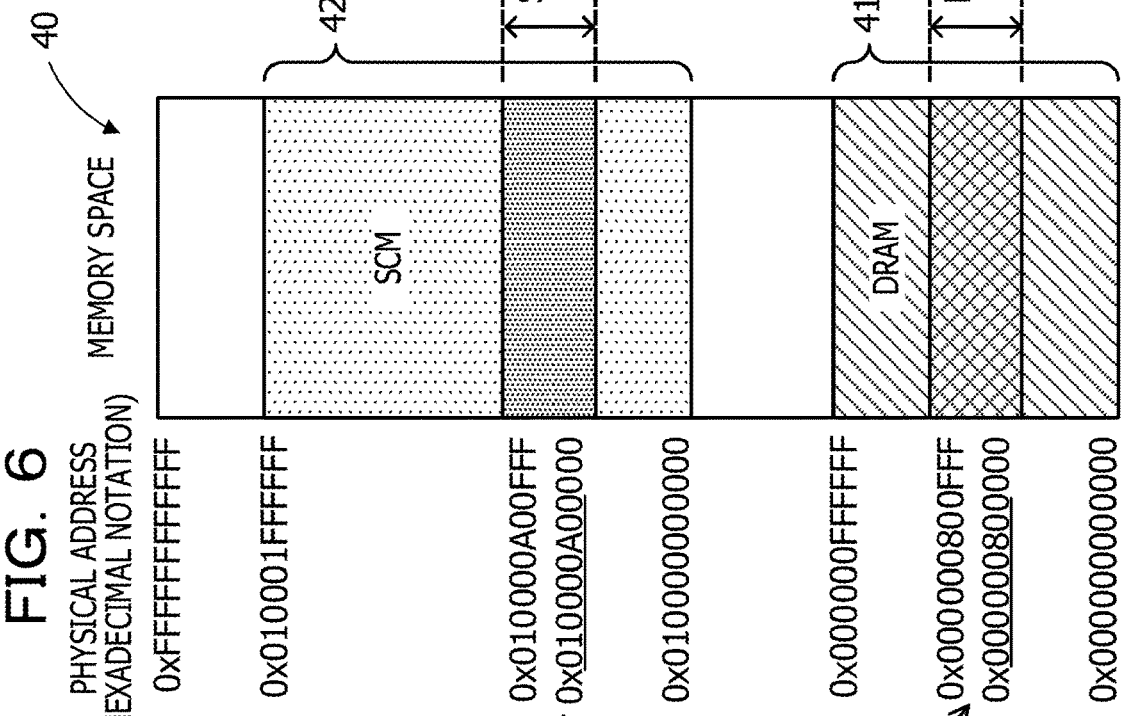
FIG. 6 is a diagram illustrating an example of a correspondence relationship between a page frame number and a memory space.

FIG. 6 is a diagram illustrating an example of a correspondence relationship between a page frame number and a memory space. For example, the memory management portion 112 uses a physical address included in a memory space 40 for access to the DRAM 102 and the SCM 103. For example, the memory space 40 has a head address "0x000000000000", and an end address "0xFFFFFFFFFFFF". In the memory space 40, a partial space 41 corresponds to a storage region of the DRAM 102. For example, a physical address range corresponding to the partial space 41 is "0x000000000000 to 0x000000FFFFFF". In the memory space 40, a partial space 42 corresponds to a storage region of the SCM 103. For example, a physical address range corresponding to the partial space 42 is "0x010000000000 to 0x010001FFFFFF".

As described above, a page size is 0x1000 bytes. In this case, a physical address (a head address of a frame) indicated by the page frame number "0x000000800" in the entry of "#00052" of the page table 160 is "0x000000800000". An end address of the frame is "0x000000800FFF". For example, a physical address corresponding to the entry of "#00052" is included in the partial space 41. Therefore, a page corresponding to the entry of "#00052" is stored in the DRAM 102.

For example, a physical address (a head address of a frame) indicated by the page frame number "0x010000A00" in the entry of "#00160" of the page table 160 is "0x010000A00000". An end address of the frame is "0x010000A00FFF". For example, a physical address corresponding to the entry of "#00160" is included in the partial space 42. Therefore, a page corresponding to the entry of "#00160" is stored in the SCM 103.

Here, in the following description, among page frame numbers stored in the page table 160, a page frame number included in the partial space 41 corresponding to the DRAM 102 will be referred to as a "DRAM physical frame number" in some cases. Here, in the following description, among page frame numbers stored in the page table 160, a page frame number included in the partial space 42 corresponding to the SCM 103 will be referred to as an "SCM physical frame number" in some cases.

Figure 7:
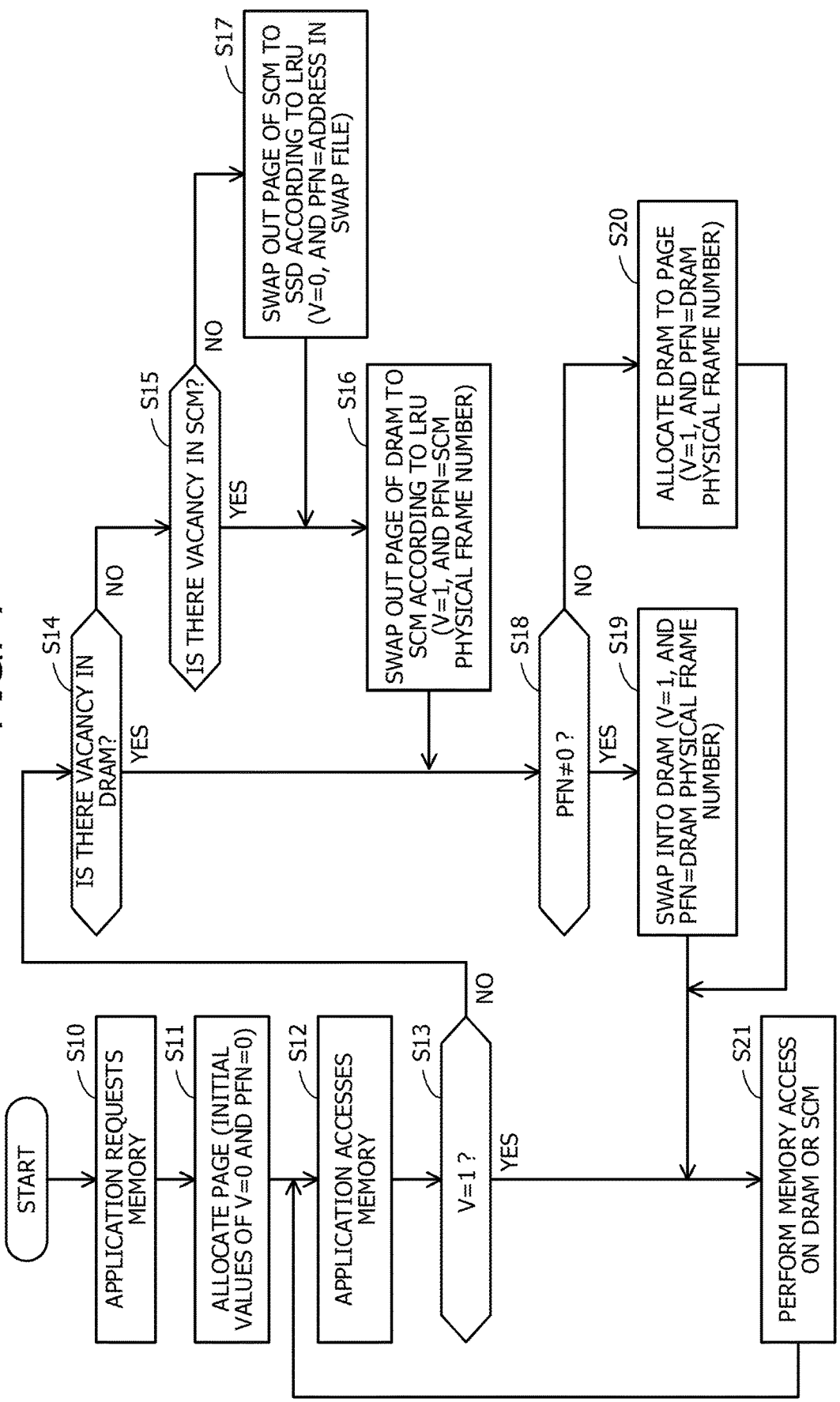
FIG. 7 is a flowchart illustrating a process example of memory management.

Next, a description will be made of process procedures for memory management in the memory management portion 112. FIG. 7 is a flowchart illustrating a process example of memory management.

In a case where the application 111 is activated, the memory management portion 112 continuously executes the following procedures until the application 111 is stopped.

(S10) The application 111 sends a request for a memory to the memory management portion 112. The memory management portion 112 receives the request for a memory.

(S11) The memory management portion 112 allocates a page to the application 111. The memory management portion 112 registers information regarding the allocated page in the page table 160. In this stage, initial values are registered for a valid flag (V) and a page frame number (PFN) in relation to the page allocated to the application 111. An initial value of the valid flag (V) is "0". An initial value of the page frame number (PFN) is "0". For example, the memory management portion 112 may notify the application 111 of a virtual address corresponding to the allocated page.

(S12) The application 111 accesses the memory. The memory management portion 112 receives memory access performed by the application 111. For example, the application 111 designates a virtual address corresponding to the page allocated by the memory management portion 112, and sends access to the memory to the memory management portion 112. As described above, the virtual address is correlated with, for example, an entry number of the page table 160. Thus, the memory management portion 112 may specify an entry in the page table 160 corresponding to the requested page based on the virtual address.

(S13) The memory management portion 112 determines whether or not a valid flag corresponding to the requested page is 1 (V=1) by referring to the page table 160. In a case of V=1, the process proceeds to step S21. In a case of V=0, the process proceeds to step S14.

(S14) The memory management portion 112 determines whether or not there is a vacancy in the DRAM 102. In a case where there is a vacancy in the DRAM 102, the process proceeds to step S18. In a case where there is no vacancy in the DRAM 102, the process proceeds to step S15.

(S15) The memory management portion 112 determines whether or not there is a vacancy in the SCM 103. In a case where there is a vacancy in the SCM 103, the process proceeds to step S16. In a case where there is no vacancy in the SCM 103, the process proceeds to step S17.

(S16) The memory management portion 112 swaps out a page of the DRAM 102 to the SCM 103 according to LRU. The memory management portion 112 updates information in the page table 160 with respect to the swapped-out page. For example, the memory management portion 112 maintains a valid flag of the corresponding page to be "1" (V=1) (this is because a swap-out source of the page is the DRAM 102, and the valid flag is "1"). The memory management portion 112 changes a page frame number (PFN) of the corresponding page from a DRAM physical frame number of the swap-out source to an SCM physical frame number of the swap-out destination. The process proceeds to step S18.

(S17) The memory management portion 112 swaps out a page of the SCM 103 to the SSD 104 according to LRU. The memory management portion 112 updates information in the page table 160 with respect to the swapped-out page. For example, the memory management portion 112 updates a valid flag of the corresponding page from "1" (V=1) to "0" (V=0). The memory management portion 112 changes a page frame number (PFN) of the corresponding page from an SCM physical frame number of the swap-out source to an address in a swap file (address in swap file) stored in the SSD 104. The process proceeds to step S16.

(S18) The memory management portion 112 determines whether or not a page frame number (PFN) of the page to which access is requested is a number other than "0" (PFN≠0). In a case where the PFN is a number other than "0" (PFN≠0), the process proceeds to step S19. In a case of the PFN=0, the process proceeds to step S20. In a case of the PFN≠0 in step S18, this indicates that the corresponding page is swapped out to the SSD 104. In a case of the PFN=0 in step S18, this indicates that a DRAM region is not allocated to the corresponding page.

(S19) The memory management portion 112 swaps the page to which access is requested into the DRAM 102 from the SSD 104. The memory management portion 112 updates information in the page table 160 with respect to the swapped-in page. For example, the memory management portion 112 updates a valid flag of the corresponding page from "0" (V=0) to "1" (V=1). The memory management portion 112 changes a page frame number (PFN) of the corresponding page from an address in a swap file of the swap-in source to a DRAM physical frame number of the swap-in distribution. The process proceeds to step S21.

(S20) The memory management portion 112 allocates a frame of the DRAM 102 to the page to which access is requested. The memory management portion 112 updates information in the page table 160 with respect to the page. For example, the memory management portion 112 updates a valid flag of the corresponding page from "0" (V=0) to "1" (V=1). The memory management portion 112 changes a page frame number (PFN) of the corresponding page from "0" (initial value) to a DRAM physical frame number allocated this time. The process proceeds to step S21.

(S21) The memory management portion 112 performs memory access on the DRAM 102 or the SCM 103. For example, the memory management portion 112 performs writing on a page stored in the DRAM 102 or the SCM 103 in response to a writing request from the application 111, and notifies the application 111 of a writing result. The memory management portion 112 performs reading on a page stored in the DRAM 102 or the SCM 103 in response to a reading request from the application 111, and notifies the application 111 of a reading result. The process proceeds to step S12.

In step S21, in a case of Yes in step S13, the memory management portion 112 may directly access the SCM 103. In a case of Yes in step S13 (a valid flag of an access destination page is "1"), as exemplified in FIG. 6, the memory management portion 112 determines which one of the DRAM 102 and the SCM 103 stores the access destination page based on a page frame number. The memory management portion 112 specifies a storage position of the access destination page in the SCM 103 based on the page frame number.

As mentioned above, in a case where a valid flag of an access destination page is "1", the memory management portion 112 determines which one of the DRAM 102 and the SCM 103 stores the access destination page based on a page frame number stored in the page table 160. The memory management portion 112 specifies a storage position at which the corresponding page is stored in the DRAM 102 or the SCM 103 determined as a storage destination based on the page frame number, and directly accesses the page.

In a case where a page is stored in the SCM 103, the memory management portion 112 sets "1" in a valid flag, and also sets an SCM physical frame number in a page frame number. Through the operation, the memory management portion 112 may directly access the SCM 103 by changing an access destination from the DRAM 102 to the SCM 103 without changing a virtual address acquired by the application 111.

Figure 8:
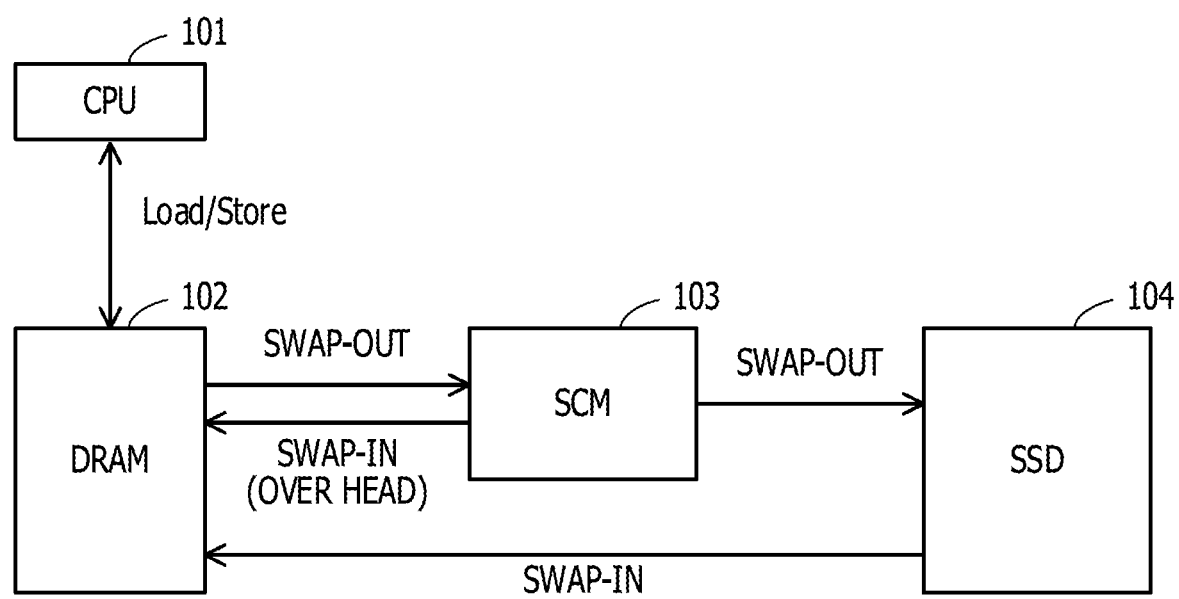

FIG. 8 is a diagram illustrating a comparative example of swap-out/swap-in. There may be a configuration in which the CPU 101 does not directly access the SCM 103. For example, the CPU 101 performs access to only the DRAM 102 by using a load/store command, and swaps a page stored in the SCM 103 into the DRAM 102, and then accesses the page stored in the DRAM 102. However, in this case, when a page stored in the SCM 103 is accessed, an overhead caused by swap-in to the DRAM 102 is problematic. In recent years, a storage device which is operated at a considerably higher speed than the SSD 104 has been available as the SCM 103. Thus, in a case where swap-in from the SCM 103 to the DRAM 102 is performed, data access performance may be reduced due to the swap-in. Thus, as exemplified in FIGS. 6 and 7, the CPU 101 also directly accesses the SCM 103 such that an overhead caused by swap-in from the SCM 103 to the DRAM 102, and may thus perform data access at a high speed.

In this case, whether or not a page is accessible without swap-in may be managed depending on whether or not a valid flag of the page is "1", and whether a storage destination of the page is the DRAM 102 or the SCM 103 may be managed based on a page frame number corresponding to a physical address. Thus, for example, a simple swap structure such as a combination of a single valid flag and a page frame number may be used without being changed. Consequently, the function of direct access to the DRAM 102 and the SCM 103 may be realized with a simple data structure, and thus an increase of a size of the page table 160 is suppressed. It is possible to avoid process steps for realizing the function from being complicated. As a result, it is possible to further reduce an overhead caused by data access and thus to perform data access at a high speed.

Next, a third embodiment will be described. Contents which are different from those of the second embodiment will be focused, and a description of contents common thereto will be omitted.

Here, a hardware example and a function example of a server of the third embodiment are the same as the hardware example and the function example of the server 100 of the second embodiment exemplified in FIGS. 2 and 3. Therefore, the same names and reference numerals as the names and the reference numerals exemplified in FIGS. 2 and 3 are also used in the third embodiment.

There may be a configuration in which the memory management portion 112 can be controlled to prioritize the SCM 103 or prioritize the SSD 104 as a storage distribution of a corresponding page according to data characteristics of each page. For example, some pages for which an access frequency is relatively low are preferentially stored in the SCM 103 or the SSD 104 such that a usage region of the DRAM 102 is reduced, and thus an overhead caused by swap-out or swap-in may be further reduced.

FIG. 9 is a diagram illustrating an example of a page table of the third embodiment. The memory management portion 112 uses a page table 170 instead of the page table 160. The page table 170 includes items of an entry number, a page frame number (PFN), a valid flag (V), and a data characteristic (N). The page table 170 is different from the page table 160 of the second embodiment in that the item of the data characteristic is provided. Information registered in an entry number, a page frame number, and a valid flag is the same as information registered in the items of the same names of the page table 160, and thus a description thereof will be omitted.

Information indicating whether the SCM 103 is prioritized ("SCM prioritized") or the SSD 104 is prioritized ("SSD prioritized") as a storage distribution of a corresponding page is registered in the item of the data characteristic. Information ("normal") indicating a target page on which swap-in/swap-out described in FIG. 7 of the second embodiment is performed may also be registered in the item of the data characteristic. When a page is allocated to the application 111, the memory management portion 112 performs setting in advance in the item of the data characteristic in response to an instruction from the application 111.

Here, specific memory hierarchy control performed by the memory management portion 112 for each data characteristic is as follows. In "normal", the memory management portion 112 moves a page in an order of the DRAM 102, the SCM 103, and the SSD 104. In "SCM prioritized", when a page to be moved to the SSD 104 is selected, the memory management portion 112 preferentially selects a page which is not set to be SCM-prioritized, and moves a page which is set to be SCM-prioritized to the SSD 104 in a case where there is no page which is not set to be SCM-prioritized. In a case where a page set to be SCM-prioritized is moved to the SSD 104, the memory management portion 112 moves the page to the SCM 103 at the next access. In "SSD prioritized", when the memory management portion 112 swaps out a page from the DRAM 102, the memory management portion 112 swaps out the page to the SSD 104 without using the SCM 103.

For example, an entry including an entry number "#00052", a page frame number "0x000000800", a valid flag "1", and a data characteristic "SCM prioritized" is registered in the page table 170. This entry indicates that a valid flag for a page corresponding to "#00052" is "1", and a page frame number is "0x000000800". This entry indicates that the page is preferentially stored in the SCM 103.

An entry including an entry number "#00160", a page frame number "0x010000A00", a valid flag "1", and a data characteristic "normal" is registered in the page table 170. This entry indicates that a valid flag for a page corresponding to "#00160" is "1", and a page frame number is "0x010000A00". This entry indicates that the page is a target page on which "normal" swap-in/swap-out described in FIG. 7 of the second embodiment is performed.

An entry including an entry number "#00250", a page frame number "address X in swap file", a valid flag "0", and a data characteristic "SSD prioritized" is registered in the page table 170. This entry indicates that a valid flag for a page corresponding to "#00250" is "0", and a page frame number is "address X in swap file". This entry indicates that the page is preferentially stored in the SSD 104.

Figure 10:
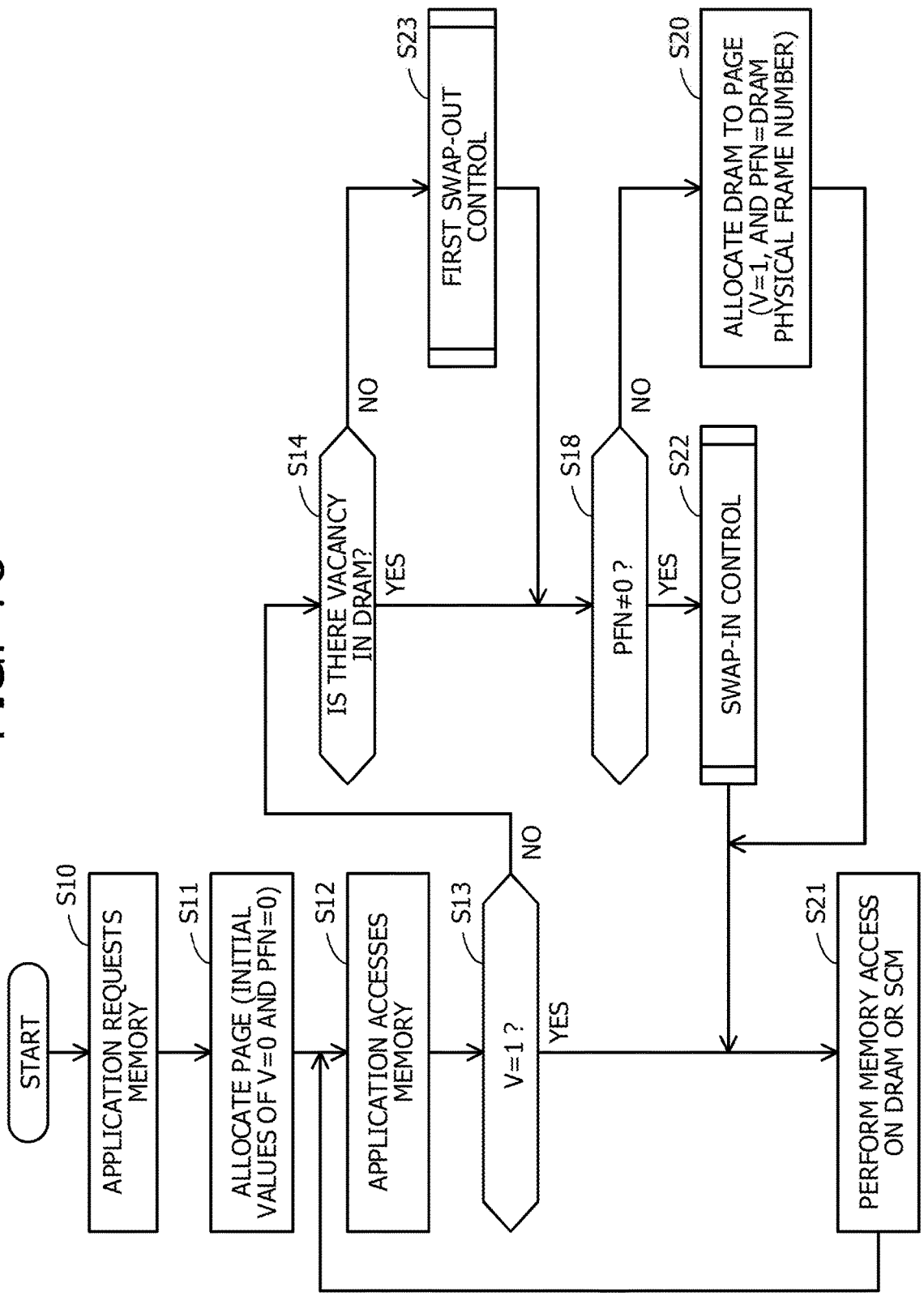
FIG. 10 is a flowchart illustrating a process example of memory management.

Next, a description will be made of process procedures for memory management in the memory management portion 112. FIG. 10 is a flowchart illustrating a process example of memory management.

In the third embodiment, the memory management portion 112 executes step S22 instead of step S19 in the procedures illustrated in FIG. 7. For example, the memory management portion 112 executes step S22 in a case of Yes in step S18, and executes step S20 in a case of No in step S18. In the third embodiment, the memory management portion 112 executes step S23 instead of steps S15 and S16 in the procedures illustrated in FIG. 7. For example, the memory management portion 112 executes step S18 in a case of Yes in step S14, and executes step S23 in a case of No in step S14. Therefore, in the following description, steps S22 and S23 will be described, and a description of the rest steps will be omitted. However, the memory management portion 112 acquires information regarding a data characteristic for an allocated page from the application 111, for example, in step S11, and registers the information in the page table 170.

(S22) The memory management portion 112 controls swap-in from the SSD 104 based on a data characteristic of an access target page in step S12. Details of swap-in control will be described later. The process proceeds to step S21.

(S23) The memory management portion 112 specifies a swap-out target page from the DRAM 102, and controls first swap-out from the DRAM 102 based on a data characteristic of the page. Details of first swap-out control will be described later. The process proceeds to step S18.

Figure 11:
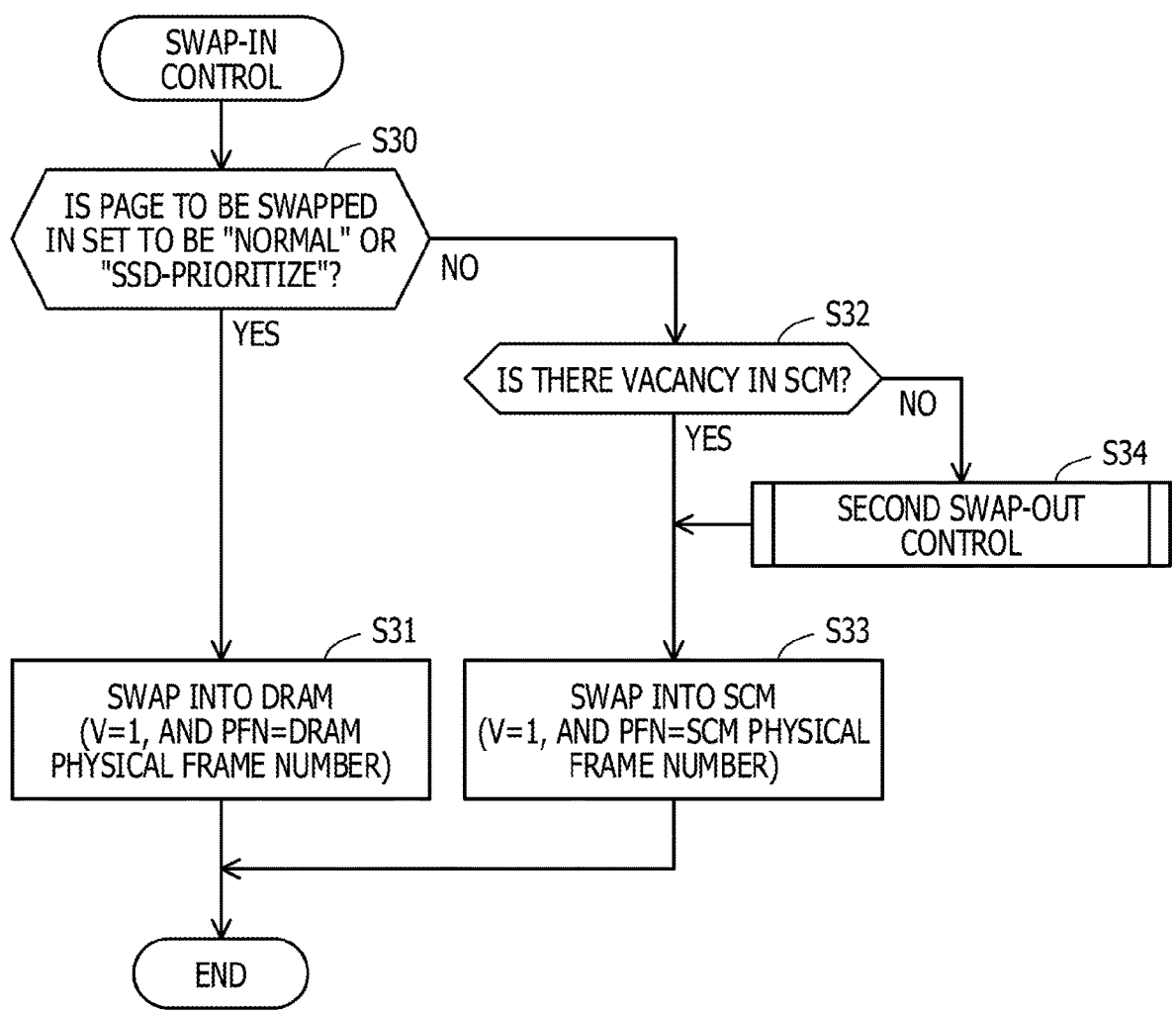
FIG. 11 is a flowchart illustrating a process example of swap-in control.

FIG. 11 is a flowchart illustrating a process example of swap-in control. The swap-in control is performed in step S22.

(S30) The memory management portion 112 determines whether a data characteristic of the swapped-in page is "normal" or "SSD prioritized" by referring to the page table 170. In a case where the data characteristic is "normal" or "SSD prioritized", the process proceeds to step S31. In a case where the data characteristic is neither "normal" nor "SSD prioritized" (for example, "SCM prioritized"), the process proceeds to step S32.

(S31) The memory management portion 112 swaps the corresponding page into the DRAM 102. The memory management portion 112 updates information in the page table 170 with respect to the swapped-in page. For example, the memory management portion 112 updates a valid flag of the corresponding page from "0" (V=0) to "1" (V=1). The memory management portion 112 changes a page frame number (PFN) of the corresponding page from an address in a swap file of the swap-in source to a DRAM physical frame number of the swap-in distribution. The swap-in control is finished.

(S32) The memory management portion 112 determines whether or not there is a vacancy in the SCM 103. In a case where there is a vacancy in the SCM 103, the process proceeds to step S33. In a case where there is no vacancy in the SCM 103, the process proceeds to step S34.

(S33) The memory management portion 112 swaps the corresponding page into the SCM 103. The memory management portion 112 updates information in the page table 170 with respect to the swapped-in page. For example, the memory management portion 112 updates a valid flag of the corresponding page from "0" (V=0) to "1" (V=1). The memory management portion 112 changes a page frame number (PFN) of the corresponding page from an address in a swap file of the swap-in source to an SCM physical frame number of the swap-in distribution. The swap-in control is finished.

(S34) The memory management portion 112 specifies a swap-out target page from the SCM 103, and controls second swap-out from the SCM 103 based on a data characteristic of the page. Details of second swap-out control will be described later. The process proceeds to step S33.

Figure 12:
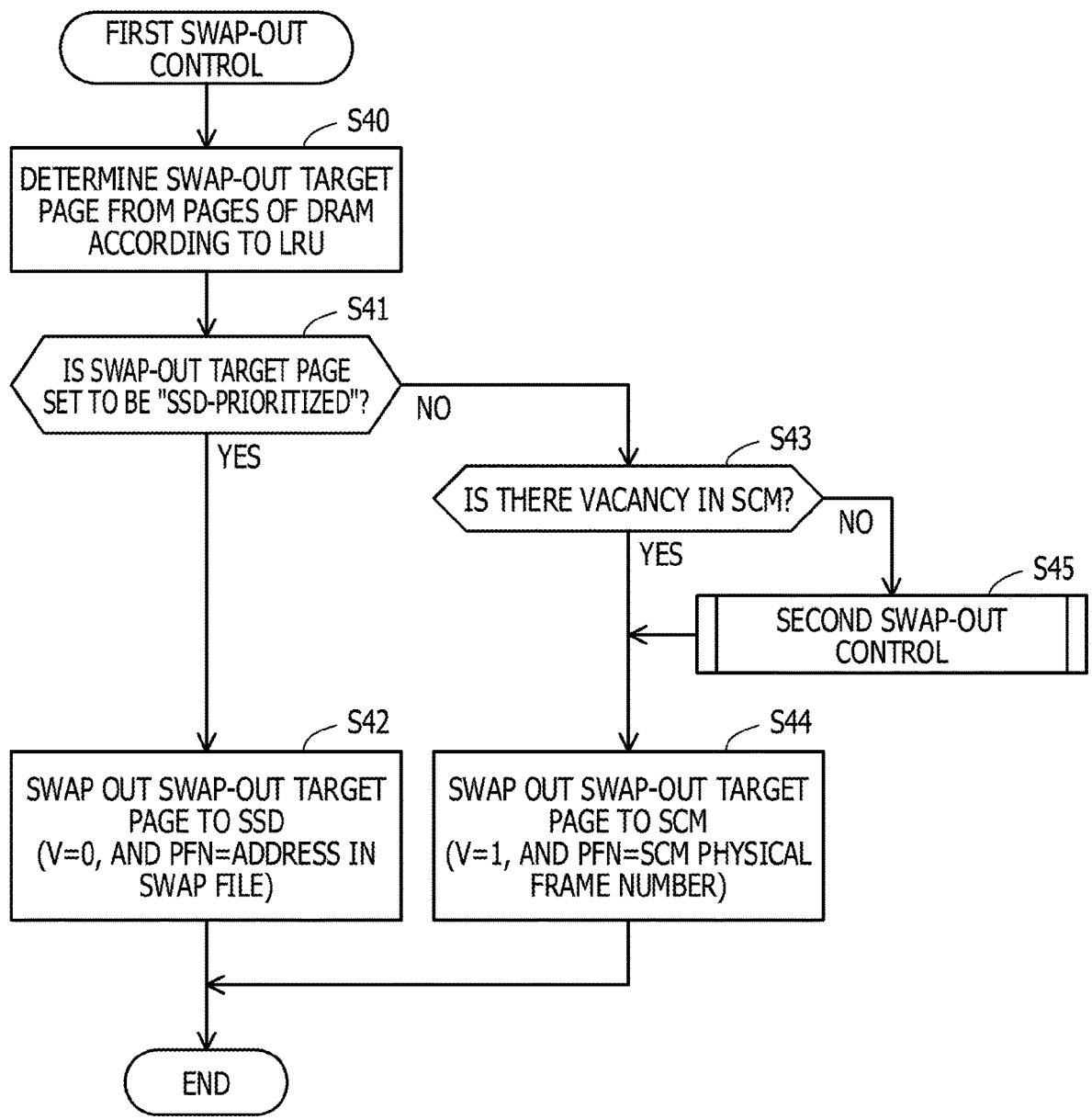
FIG. 12 is a flowchart illustrating a process example of first swap-out control.

FIG. 12 is a flowchart illustrating a process example of first swap-out control. The first swap-out control is performed in step S23.

(S40) The memory management portion 112 determines a swap-out target page from pages of the DRAM 102 according to LRU.

(S41) The memory management portion 112 determines whether or not a data characteristic of the swap-out target page is "SSD prioritized" by referring to the page table 170. In a case where the data characteristic is "SSD prioritized", the process proceeds to step S42. In a case where the data characteristic is not "SSD prioritized", the process proceeds to step S43.

(S42) The memory management portion 112 swaps out the swap-out target page to the SSD 104. The memory management portion 112 updates information in the page table 170 with respect to the swapped-out page. For example, the memory management portion 112 updates a valid flag of the corresponding page from "1" (V=1) to "0" (V=0). The memory management portion 112 changes a page frame number (PFN) of the corresponding page from a DRAM physical frame number of the swap-out source to an address in a swap file (address in swap file) stored in the SSD 104. The first swap-out control is finished.

(S43) The memory management portion 112 determines whether or not there is a vacancy in the SCM 103. In a case where there is a vacancy in the SCM 103, the process proceeds to step S44. In a case where there is no vacancy in the SCM 103, the process proceeds to step S45.

(S44) The memory management portion 112 swaps out the swap-out target page to the SCM 103. The memory management portion 112 updates information in the page table 170 with respect to the swapped-out page. For example, the memory management portion 112 maintains a valid flag of the corresponding page to be "1" (V=1) (this is because a swap-out source of the page is the DRAM 102, and the valid flag is "1"). The memory management portion 112 changes a page frame number (PFN) of the corresponding page from a DRAM physical frame number of the swap-out source to an SCM physical frame number of the swap-out destination. The first swap-out control is finished.

(S45) The memory management portion 112 specifies a swap-out target page from the SCM 103, and controls second swap-out from the SCM 103 based on a data characteristic of the page. Details of second swap-out control will be described later. The process proceeds to step S44.

Figure 13:
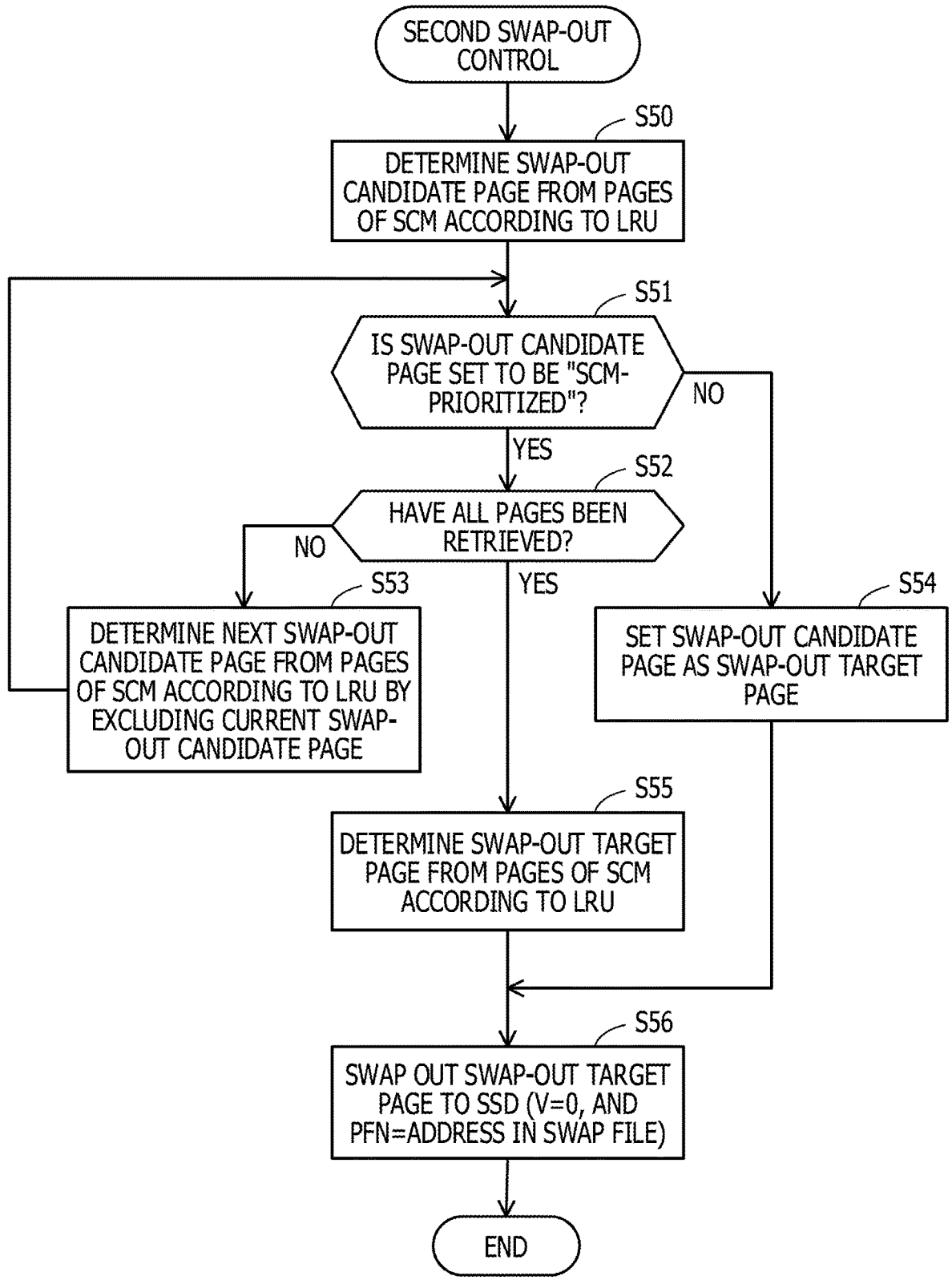
FIG. 13 is a flowchart illustrating a process example of second swap-out control.

FIG. 13 is a flowchart illustrating a process example of second swap-out control. The second swap-out control is performed in steps S34 and S45.

(S50) The memory management portion 112 determines a swap-out candidate page from pages of the SCM 103 according to LRU.

(S51) The memory management portion 112 determines whether or not a data characteristic of the swap-out candidate page is "SCM prioritized" by referring to the page table 170. In a case where the data characteristic is "SCM prioritized", the process proceeds to step S52. In a case where the data characteristic is not "SCM prioritized", the process proceeds to step S54.

(S52) The memory management portion 112 determines whether or not all pages stored in the SCM 103 have been retrieved as swap-out candidates. In a case where all the pages have been retrieved, the process proceeds to step S55. In a case where all the pages have not been retrieved, the process proceeds to step S53.

(S53) The memory management portion 112 determines the next swap-out candidate page from pages of the SCM 103 according to LRU by excluding the current swap-out candidate page. The process proceeds to step S51.

(S54) The memory management portion 112 sets the swap-out candidate page as a swap-out target page. The process proceeds to step S56.

(S55) The memory management portion 112 determines a swap-out target page from pages of the SCM 103 according to LRU. In this case, the memory management portion 112 determines a swap-out target page regardless of a data characteristic of each page of the SCM 103. Thus, the memory management portion 112 may determine a page which is not set to be "SCM-prioritized" as a swap-out target page.

(S56) The memory management portion 112 swaps out the swap-out target page to the SSD 104. The memory management portion 112 updates information in the page table 170 with respect to the swapped-out page. For example, the memory management portion 112 updates a valid flag of the corresponding page from "1" (V=1) to "0" (V=0). The memory management portion 112 changes a page frame number (PFN) of the corresponding page from an SCM physical frame number of the swap-out source to an address in a swap file (address in swap file) stored in the SSD 104. The second swap-out control is finished.

As mentioned above, the memory management portion 112 performs hierarchy control corresponding to a data characteristic, and may thus select a storage destination suitable for each piece of data. As a result, it is possible to perform data access at a high speed by reducing unnecessary data movement caused by swap-out/swap-in.

Next, a fourth embodiment will be described. Contents which are different from those of the second and third embodiments will be focused, and a description of contents common thereto will be omitted.

Here, a hardware example and a function example of a server of the fourth embodiment are the same as the hardware example and the function example of the server 100 of the second embodiment exemplified in FIGS. 2 and 3. Therefore, the same names and reference numerals as the names and the reference numerals exemplified in FIGS. 2 and 3 are also used in the fourth embodiment.

In the fourth embodiment, a function is provided in which a read frequency and a write frequency are set as data characteristics of each page, and a swap-in destination of the page is selected according to the data characteristics.

FIG. 14 is a diagram illustrating an example of a page table of the fourth embodiment. The memory management portion 112 uses a page table 180 instead of the page table 160. The page table 180 includes items of an entry number, a page frame number (PFN), a valid flag (V), and data characteristics (N). The page table 180 is different from the page table 160 of the second embodiment in that the item of the data characteristics is provided. Information registered in an entry number, a page frame number, and a valid flag is the same as information registered in the items of the same names of the page table 160, and thus a description thereof will be omitted.

Information indicating an access frequency for a corresponding page is registered in the item of the data characteristics. The access frequency includes, for example, a read frequency and a write frequency (however, either one of the read frequency and the write frequency may be used).

For example, the read frequency "low" indicates that the read frequency is relatively low (for example, the read frequency is less than a first threshold value). The read frequency "high" indicates that the read frequency is relatively high (for example, the read frequency is more than a second threshold value (> the first threshold value)). The read frequency "intermediate" indicates that the read frequency is interposed between the read frequency "high" and the read frequency "low" (for example, the first threshold value or more and the second threshold value or less).

The write frequency "low" indicates that the write frequency is relatively low (for example, the write frequency is less than a third threshold value). The write frequency "high" indicates that the write frequency is relatively high (for example, the write frequency is more than a fourth threshold value). The write frequency "intermediate" indicates that the write frequency is interposed between the write frequency "high" and the write frequency "low" (for example, the third threshold value or more and the fourth threshold value or less).

When a page is allocated to the application 111, the memory management portion 112 performs setting in advance in the item of the data characteristics in response to an instruction from the application 111. However, the memory management portion 112 may monitor an access frequency for each page, and may register data characteristics (a read frequency and a write frequency) of each page in the page table 180 based on the monitoring result.

For example, an entry including an entry number "#00052", a page frame number "0x000000800", a valid flag "1", the read frequency "high", and the write frequency "low" is registered in the page table 180. This entry indicates that a valid flag for a page corresponding to "#00052" is "1", and a page frame number is "0x000000800". This entry indicates that the page has a high read frequency and a low write frequency.

An entry including an entry number "#00160", a page frame number "0x010000A00", a valid flag "1", the read frequency "high", and the write frequency "high" is registered in the page table 180. This entry indicates that a valid flag for a page corresponding to "#00160" is "1", and a page frame number is "0x010000A00". This entry indicates that the page has a high read frequency and a high write frequency.

An entry including an entry number "#00250", a page frame number "address X in swap file", a valid flag "0", the read frequency "low", and the write frequency "low" is registered in the page table 180. This entry indicates that a valid flag for a page corresponding to "#00250" is "0", and a page frame number is "address X in swap file". This entry indicates that the page has a low read frequency and a low write frequency.

Next, a description will be made of a swap-in control table in which a swap-in control method is defined according to a read frequency and a write frequency. FIG. 15 is a diagram illustrating an example of a swap-in control table.

A swap-in control table 190 is stored in, for example, a buffer of the MMU 120 in advance. The swap-in control table 190 may be stored in advance in a predetermined region of the DRAM 102, the SCM 103, or the SSD 104. The swap-in control table 190 includes items of a read frequency, a write frequency, initial disposition, SCM←SSD, and DRAM←SSD. Here, the notation "←" indicates a leftward arrow, and indicates swap-in from a right storage device to a left storage device.

A read frequency is registered in the item of the read frequency. For example, the read frequency has three stages such as "high", "intermediate", and "low". A write frequency is registered in the item of the write frequency. For example, the write frequency has three steps such as "high", "intermediate", and "low". Initial disposition of a page is registered in the item of the initial disposition. A "DRAM" or an "SCM" may be selected as the initial disposition of a page.

Information indicating whether or not swap-in from the SSD 104 to the SCM 103 and information indicating which one of page movement and page copying is performed in a case where the swap-in is performed are registered in the item of SCM←SSD. "Movement" or "copying" is registered in the item of SCM←SSD in a case where swap-in is performed. In a case where swap-in is not performed, there is no setting in the item of SCM←SSD.

Information indicating whether or not swap-in from the SSD 104 to the DRAM 102 and information indicating which one of page movement and page copying is performed in a case where the swap-in is performed are registered in the item of DRAM←SSD. "Movement" or "copying" is registered in the item of DRAM←SSD in a case where swap-in is performed. In a case where swap-in is not performed, there is no setting in the item of DRAM←SSD.

Here, "movement" indicates that a page is moved from a storage device which is a swap-in source to a storage device which is a swap-in destination. In a case where a page is moved, the memory management portion 112 deletes the page from a storage device which is a swap-in source such that the region of the page can be reused. "Copying" indicates that a page is copied from a storage device which is a swap-in source to a storage device which is a swap-in destination. In a case where a page is copied, the memory management portion 112 maintains the page without deleting the page from a storage device which is a swap-in source. In a case where a certain page is copied during swap-in, the memory management portion 112 may delete the page from a swap-out destination and may not write the page into a swap-out destination when the next swap-out is performed in a state in which the page is not updated. Thus, it is possible to reduce an overhead caused by page writing during swap-out.

For example, an entry including the read frequency "high", the write frequency "high", initial disposition "DRAM", no setting ("-") in SCM←SSD, and "movement" in DRAM←SSD is registered in the swap-in control table 190. This entry indicates that initial disposition of a page having data characteristics such as the read frequency "high" and the write frequency "high" is the DRAM 102. This entry indicates that the page is swapped in through page movement from the SSD 104 to the DRAM 102. On the other hand, this entry indicates that the page having the data characteristics such as the read frequency "high" and the write frequency "high" is not swapped into the SCM 103 from the SSD 104.

An entry including the read frequency "high", the write frequency "intermediate", initial disposition "DRAM", no setting ("-") in SCM←SSD, and "movement" in DRAM←SSD is registered in the swap-in control table 190. This entry indicates that initial disposition of a page having data characteristics such as the read frequency "high" and the write frequency "intermediate" is the DRAM 102. This entry indicates that the page is swapped in through page movement from the SSD 104 to the DRAM 102. On the other hand, this entry indicates that the page having the data characteristics such as the read frequency "high" and the write frequency "intermediate" is not swapped into the SCM 103 from the SSD 104.

An entry including the read frequency "high", the write frequency "low", initial disposition "DRAM", no setting ("-") in SCM←SSD, and "copying" in DRAM←SSD is registered in the swap-in control table 190. This entry indicates that initial disposition of a page having data characteristics such as the read frequency "high" and the write frequency "low" is the DRAM 102. This entry indicates that the page is swapped in through page copying from the SSD 104 to the DRAM 102. On the other hand, this entry indicates that the page having the data characteristics such as the read frequency "high" and the write frequency "low" is not swapped into the SCM 103 from the SSD 104.

In the swap-in control table 190, for other data characteristics (for example, a combination of the read frequency "intermediate" and the write frequency "high"), the items of initial disposition, SCM←SSD, and DRAM←SSD are set. For example, in the swap-in control table 190, each entry is set such that a page which is accessed at a relatively high frequency is preferentially disposed in the DRAM 102 or the SCM 103, and a page which is accessed at a relatively low frequency is preferentially disposed in the SSD 104. Each entry is set such that swap-in is performed through page movement as the write frequency becomes higher, and swap-in is performed through page copying as the write frequency becomes lower. This is because, in a case where the write frequency is high, there is a high possibility that a page can be rewritten through page update.

Figure 16:
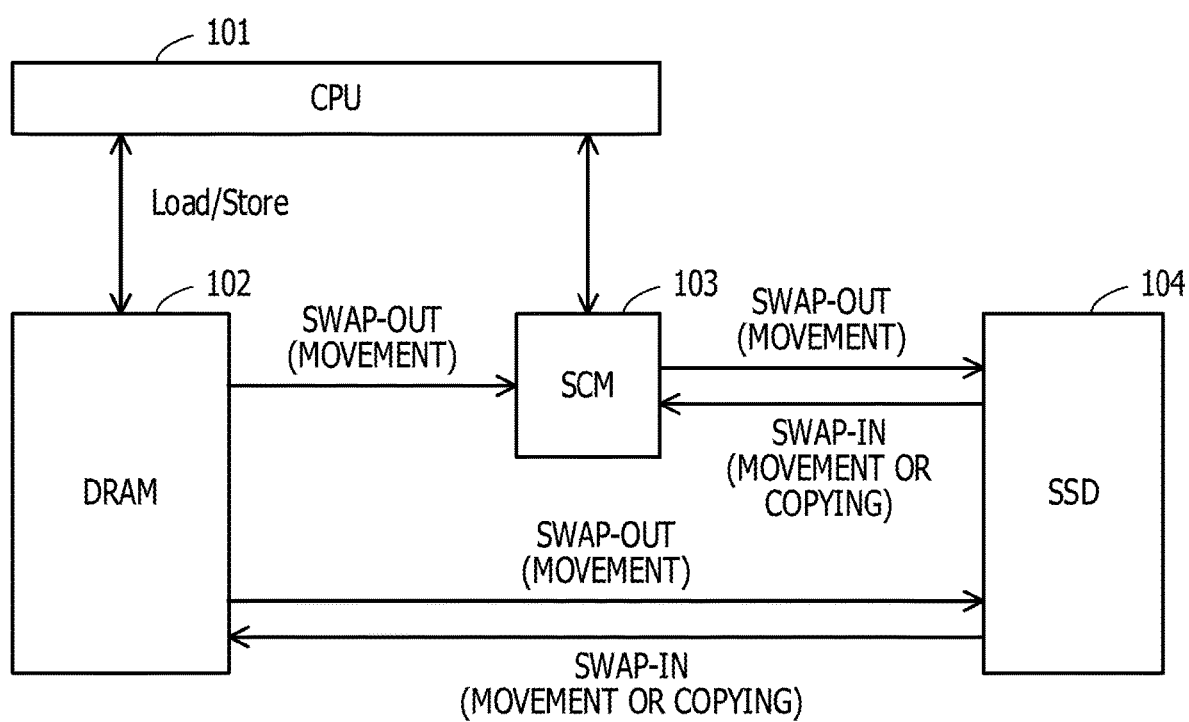

FIG. 16 is a diagram illustrating an example of swap-out/swap-in. For example, the memory management portion 112 receives an instruction for data characteristics of an allocated page from the application 111 in step S11 in FIG. 7, and stores the data characteristics in the page table 180.

In step S19 in FIG. 7, in a case where swap-in of a page from the SSD 104 is performed, the memory management portion 112 determines one of the SCM 103 and the DRAM 102 as a swap-in destination based on data characteristics of the page and the swap-in control table 190. The memory management portion 112 allocates a frame of the determined storage device to the page. For example, in a case where a frame of the SCM 103 is allocated, the memory management portion 112 sets a valid flag of the page to "1", and registers an SCM physical frame number in the page table 180 as a page frame number of the page. The memory management portion 112 determines one of "movement" and "copying" as a swap-in method based on the swap-in control table 190 during swap-in.

In step S20 in FIG. 7, the memory management portion 112 determines which one of the DRAM 102 and the SCM 103 is allocated to the page as initial disposition based on the data characteristics of the page and the swap-in control table 190. The memory management portion 112 allocates, to the page, a frame of a storage device having initial disposition set in the swap-in control table 190 with respect to the corresponding data characteristics. For example, in a case where a frame of the DRAM 102 is allocated, the memory management portion 112 sets a valid flag of the page to "1", and registers a DRAM physical frame number in the page table 180 as a page frame number of the page. Alternatively, in a case where a frame of the SCM 103 is allocated, the memory management portion 112 sets a valid flag of the page to "1", and registers an SCM physical frame number of the storage destination in the page table 180 as a page frame number of the page.

FIG. 16 exemplifies swap-out and swap-in among the DRAM 102, the SCM 103, and the SSD 104. For example, a page stored in the DRAM 102 may be swapped out to the SCM 103 through movement of the page. A page stored in the SCM 103 may be swapped out to the SSD 104 through movement of the page.

As described above, in a case where the same page as a swap-out target page is present in a swap-out destination due to swap-in being performed through copying, the memory management portion 112 may delete a page of a swap-out source during swap-out of the page. With this structure, a page stored in the DRAM 102 may be swapped out to the SSD 104 through movement of the page (however, in this case, the memory management portion 112 may delete the swap-out target page stored in the DRAM 102). Similarly, in a case of swap-out from the DRAM 102 to the SCM 103 and swap-out from the SCM 103 to the SSD 104, swap-out may be performed by deleting a swap-out target page from a storage device which is a swap-out source.

A page stored in the SSD 104 may be swapped into the SCM 103 through movement or copying of the page. A page stored in the SSD 104 may be swapped into the DRAM 102 through movement or copying of the page.

As mentioned above, the CPU 101 may select a storage destination or a swap-in method (movement or copying) suitable for a corresponding page by performing hierarchy control corresponding to data characteristics of each page in the page table 180. Thus, it is possible to reduce unnecessary page movement caused by swap-out or swap-in and thus to perform data access at a high speed.

The information processes of the first embodiment may be realized by causing the processing unit 14 to execute a program including a plurality of commands. The information processes of the second, third, and fourth embodiments may be realized by causing the CPU 101 to execute a program. The programs may be recorded on the computer readable recording medium 203.

For example, a program may be distributed by delivering the recording medium 203 recording the program. The program may be stored in another computer, and the program may be distributed via a network. For example, a computer may store (install) a program recorded on the recording medium 203 or a program received from another computer in a storage device such as the first memory 11, the second memory 12, or the third memory 13. Alternatively, for example, the computer may store (install) a program recorded on the recording medium 203 or a program received from another computer in a storage device such as the DRAM 102, the SCM 103, or the SSD 104. The computer may read the program from the storage device and may execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A memory control apparatus comprising:
   a first memory having a first transfer rate;
   a second memory having a second transfer rate lower than the first transfer rate;
   a third memory having a third transfer rate lower than the second transfer rate; and
   a processor coupled to the first memory, the second memory, and the third memory, the processor being configured to add, to management information, first identification information and information indicating a position where first data is stored when the first data is stored in the first memory, add, to the management information, information indicating a position where second data is stored when the second data is stored in the second memory, the second data being data swapped out from the first memory to the second memory based on data characteristics of the second data, add, to the management information, second identification information and information indicating a position where third data is stored when the third data is stored in the third memory, the third data being data swapped out from the first memory to the third memory based on data characteristics of the third data, determine, by referring to the management information, which one of the first identification information and the second identification information is associated with fourth data when the fourth data is accessed, perform retrieval of the fourth data from the first memory or the second memory in accordance with information, stored in the management information, indicating a position where the fourth data is stored, when the first identification information is associated with the fourth data, and determine, when the third data is swapped-in into the first memory or the second memory from the third memory, whether the third data is swapped-in by copying or swapped-in by moving, according to a write frequency included in the data characteristics of the third data.

2. The memory control apparatus according to claim 1, wherein
the fourth data is data swapped out from the first memory to the second memory, and
the retrieval includes retrieving the fourth data from the second memory without performing swap-in of the fourth data from the second memory into the first memory.

3. The memory control apparatus according to claim 1, wherein the processor is configured to
permit the first data to be swapped out from the first memory to the second memory, and
inhibit the second data from being swapped out from the second memory to the first memory.

4. The memory control apparatus according to claim 1, wherein the processor is configured to perform swap-in of the third data into the first memory or the second memory from the third memory when the third data is accessed.

5. The memory control apparatus according to claim 4, wherein the swap-in of the third data includes selecting a swap-in destination of the third data from the first memory and the second memory in accordance with specific information indicating priority of a storage destination associated with the third data.

6. The memory control apparatus according to claim 4, wherein the swap-in of the third data includes selecting a swap-in destination of the third data from the first memory and the second memory in accordance with an access frequency for the third data.

7. The memory control apparatus according to claim 1, wherein the processor is configured to
select a swap-out destination of the first data from the second memory and the third memory in accordance with an access frequency for the first data, and
perform swap-out of the first data from the first memory to the swap-out destination.

8. A computer-implemented memory control method comprising:
adding, to management information, first identification information and information indicating a position where first data is stored when the first data is stored in a first memory having a first transfer rate;
adding, to the management information, information indicating a position where second data is stored when the second data is stored in a second memory having a second transfer rate lower than the first transfer rate, the second data being data swapped out from the first memory to the second memory based on data characteristics of the second data;
adding, to the management information, second identification information and information indicating a position where third data is stored when the third data is stored in a third memory having a third transfer rate lower than the second transfer rate, the third data being data swapped out from the first memory to the third memory based on data characteristics of the third data;
determining, by referring to the management information, which one of the first identification information and the second identification information is associated with fourth data when the fourth data is accessed;
retrieving the fourth data from the first memory or the second memory in accordance with information, stored in the management information, indicating a position where the fourth data is stored, when the first identification information is associated with the fourth data;
determining swap-in of the third data into the first memory or the second memory from the third memory; and
determining whether third data is swap-in by copying or swap-in by moving, according to a write frequency included in the data characteristics of the third data.

9. The memory control method according to claim 8, wherein
the fourth data is data swapped out from the first memory to the second memory, and
the retrieving includes retrieving the fourth data from the second memory without performing swap-in of the fourth data from the second memory into the first memory.

10. The memory control method according to claim 8, further comprising:
permitting the first data to be swapped out from the first memory to the second memory; and
inhibiting the second data from being swapped out from the second memory to the first memory.

11. The memory control method according to claim 8, further comprising: performing swap-in of the third data into the first memory or the second memory from the third memory when the third data is accessed.

12. The memory control method according to claim 11, wherein the swap-in of the third data includes selecting a swap-in destination of the third data from the first memory and the second memory in accordance with specific information indicating priority of a storage destination associated with the third data.

13. The memory control method according to claim 11, wherein the swap-in of the third data includes selecting a swap-in destination of the third data from the first memory and the second memory in accordance with an access frequency for the third data.

14. The memory control method according to claim 8, further comprising:
- selecting a swap-out destination of the first data from the second memory and the third memory in accordance with an access frequency for the first data; and
- performing swap-out of the first data from the first memory to the swap-out destination.

15. A non-transitory computer-readable medium storing instructions executable by one or more computers, the instructions comprising:
- one or more instructions for adding, to management information, first identification information and information indicating a position where first data is stored when the first data is stored in a first memory having a first transfer rate;
- one or more instructions for adding, to the management information, information indicating a position where second data is stored when the second data is stored in a second memory having a second transfer rate lower than the first transfer rate, the second data being data swapped out from the first memory to the second memory based on data characteristics of the second data;
- one or more instructions for adding, to the management information, second identification information and information indicating a position where third data is stored when the third data is stored in a third memory having a third transfer rate lower than the second transfer rate, the third data is data swapped out from the first memory to the third memory based on data characteristics of the third data;
- one or more instructions for determining, by referring to the management information, which one of the first identification information and the second identification information is associated with fourth data when the fourth data is accessed;
- one or more instructions for retrieving the fourth data from the first memory or the second memory in accordance with information, stored in the management information, indicating a position where the fourth data is stored, when the first identification information is associated with the fourth data;
- one or more instructions for determining swap-in of the third data into the first memory or the second memory from the third memory; and
- one or more instructions for determining whether third data is swap-in by copying or swap-in by moving, according to a write frequency included in the data characteristics of the third data.

16. The memory control apparatus according to claim 1, wherein
- the management information includes the data characteristics of the second data and the data characteristics of the third data, the data characteristics of the second data indicating that the second memory having higher priority than the third memory as memory of swap-out destination, the data characteristics of the third data indicating that the third memory having higher priority than the second memory as memory of swap-out destination, and
- the processor selects the second memory, or the third memory based on the management information.

* * * * *